United States Patent
Iyer et al.

(10) Patent No.: US 10,461,805 B2
(45) Date of Patent: Oct. 29, 2019

(54) VALID LANE TRAINING

(71) Applicant: Intel Corporation, Santa Clara, CA (US)

(72) Inventors: Venkatraman Iyer, Austin, TX (US); Lip Khoon Teh, Penang (MY); Mahesh Wagh, Portland, OR (US); Zuoguo Wu, San Jose, CA (US); Azydee Hamid, Bayan Lepas (MY); Gerald S. Pasdast, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/761,408

(22) PCT Filed: Sep. 26, 2015

(86) PCT No.: PCT/US2015/052512
§ 371 (c)(1),
(2) Date: Mar. 19, 2018

(87) PCT Pub. No.: WO2017/052663
PCT Pub. Date: Mar. 30, 2017

(65) Prior Publication Data
US 2019/0238179 A1 Aug. 1, 2019

(51) Int. Cl.
*H04B 3/40* (2006.01)
*G06F 13/20* (2006.01)
*H04L 25/03* (2006.01)

(52) U.S. Cl.
CPC .............. *H04B 3/40* (2013.01); *G06F 13/20* (2013.01); *H04L 25/03006* (2013.01); *H04L 2025/0377* (2013.01)

(58) Field of Classification Search
CPC .............. H04B 3/40; H04L 25/03006; H04L 2025/0377; G06F 13/20
(Continued)

(56) References Cited

U.S. PATENT DOCUMENTS 7,852,757 B1 * 12/2010 Puranik .............. H04L 47/10
370/229
2008/0288664 A1 * 11/2008 Pettey .............. H04L 12/4633
710/5
(Continued)

FOREIGN PATENT DOCUMENTS

| WO | 2014065882 A1 | 5/2014 |
| WO | 2015099719 A1 | 7/2015 |
| WO | 2017052663 A1 | 3/2017 |

OTHER PUBLICATIONS

International Preliminary Report on Patentability in International Application No. PCT/US2015/052512, dated Mar. 27, 2018, 7 pages.
(Continued)

*Primary Examiner* — Hirdepal Singh
(74) *Attorney, Agent, or Firm* — Alliance IP, LLC

(57) ABSTRACT

One or more link training signals are received, including instances of a link training pattern, on a plurality of lanes of a physical link that includes at least one valid lane and a plurality of data lanes. The plurality of lanes are trained together using the link training signals to synchronize sampling of the valid lane with sampling of the plurality of data lanes. An active link state is entered and a valid signal received on the valid lane during the active link state. The valid signal includes a signal held at a value for a defined first duration and indicates that data is to be received on the plurality of data lanes in a second defined duration subsequent to the first duration. The data is to be received, during the active link state, on the plurality of data lanes during the second defined duration.

20 Claims, 21 Drawing Sheets

(58) Field of Classification Search
USPC .......................................................... 375/232
See application file for complete search history.

(56) References Cited

U.S. PATENT DOCUMENTS

| | | |
|---|---|---|
| 2009/0019326 A1 | 1/2009 | Boudon et al. |
| 2009/0252326 A1 | 10/2009 | Buchmann et al. |
| 2014/0006675 A1 | 1/2014 | Meir |
| 2014/0108698 A1* | 4/2014 | Wagh ................. H04L 41/0896 710/313 |
| 2015/0016416 A1* | 1/2015 | Hawkes ............ H04W 36/0016 370/331 |
| 2015/0103822 A1* | 4/2015 | Gianchandani ......... H04L 69/08 370/389 |
| 2017/0097866 A1* | 4/2017 | Craddock ........... G06F 11/0766 |
| 2018/0191530 A1* | 7/2018 | Wallichs ........... H04L 25/03057 |
| 2019/0121889 A1* | 4/2019 | Gold .................. G06F 16/2255 |

OTHER PUBLICATIONS

International Search Report and Written Opinion in International Application No. PCT/US2015/052512, dated Jun. 24, 2016, 9 pages.

\* cited by examiner

| Bit (in Time) | LANE 0 | LANE 1 | LANE 2 | LANE 3 | LANE 4 | LANE 5 | LANE 6 | LANE 7 | STREAM |
|---|---|---|---|---|---|---|---|---|
| 0 | x23 ^ x1 | x23 ^ x2 | x23 ^ x3 | x23 ^ x4 | x23 ^ x5 | x23 ^ x6 | x23 ^ x7 | x23 ^ x8 | x23 ^ x9 |
| 1 | x22 ^ x5 ^ x23 | x22 ^ x1 | x22 ^ x2 | x22 ^ x3 | x22 ^ x4 | x22 ^ x5 | x22 ^ x6 | x22 ^ x7 | x22 ^ x8 |
| 2 | x21 ^ x4 ^ x22 | x21 ^ x5 ^ x23 | x21 ^ x1 | x21 ^ x2 | x21 ^ x3 | x21 ^ x4 | x21 ^ x5 | x21 ^ x6 | x21 ^ x7 |
| 3 | x20 ^ x3 ^ x21 | x20 ^ x4 ^ x22 | x20 ^ x5 ^ x23 | x20 ^ x1 | x20 ^ x2 | x20 ^ x3 | x20 ^ x4 | x20 ^ x5 | x20 ^ x6 |
| 4 | x19 ^ x2 ^ x20 | x19 ^ x3 ^ x21 | x19 ^ x4 ^ x22 | x19 ^ x5 ^ x23 | x19 ^ x1 | x19 ^ x2 | x19 ^ x3 | x19 ^ x4 | x19 ^ x5 |
| 5 | x18 ^ x1 ^ x19 | x18 ^ x2 ^ x20 | x18 ^ x3 ^ x21 | x18 ^ x4 ^ x22 | x18 ^ x5 ^ x23 | x18 ^ x1 | x18 ^ x2 | x18 ^ x3 | x18 ^ x4 |
| 6 | x17 ^ x5 ^ x23 ^ x18 | x17 ^ x1 ^ x19 | x17 ^ x2 ^ x20 | x17 ^ x3 ^ x21 | x17 ^ x4 ^ x22 | x17 ^ x5 ^ x23 | x17 ^ x1 | x17 ^ x2 | x17 ^ x3 |
| 7 | x16 ^ x4 ^ x22 ^ x11 | x16 ^ x5 ^ x23 ^ x18 | x16 ^ x1 ^ x19 | x16 ^ x2 ^ x20 | x16 ^ x3 ^ x21 | x16 ^ x4 ^ x22 | x16 ^ x5 ^ x23 | x16 ^ x1 | x16 ^ x2 |

| Bit (in Time) | VALID | LANE 8 | LANE 9 | LANE 10 | LANE 11 | LANE 12 | LANE 13 | LANE 14 | LANE 15 | LANE 16 | LANE 17 | LANE 18 | LANE 19 |
|---|---|---|---|---|---|---|---|---|---|---|---|---|---|
| 0 | x23 ^ x10 | x23 ^ x11 | x23 ^ x12 | x23 ^ x13 | x23 ^ x14 | x23 ^ x15 | x23 ^ x16 | x23 ^ x17 | x23 ^ x18 | x23 ^ x19 | x23 ^ x20 | x23 ^ x21 | x23 ^ x22 |
| 1 | x22 ^ x9 | x22 ^ x10 | x22 ^ x11 | x22 ^ x12 | x22 ^ x13 | x22 ^ x14 | x22 ^ x15 | x22 ^ x16 | x22 ^ x17 | x22 ^ x18 | x22 ^ x19 | x22 ^ x20 | x22 ^ x21 |
| 2 | x21 ^ x8 | x21 ^ x9 | x21 ^ x10 | x21 ^ x11 | x21 ^ x12 | x21 ^ x13 | x21 ^ x14 | x21 ^ x15 | x21 ^ x16 | x21 ^ x17 | x21 ^ x18 | x21 ^ x19 | x21 ^ x20 |
| 3 | x20 ^ x7 | x20 ^ x8 | x20 ^ x9 | x20 ^ x10 | x20 ^ x11 | x20 ^ x12 | x20 ^ x13 | x20 ^ x14 | x20 ^ x15 | x20 ^ x16 | x20 ^ x17 | x20 ^ x18 | x20 ^ x19 |
| 4 | x19 ^ x6 | x19 ^ x7 | x19 ^ x8 | x19 ^ x9 | x19 ^ x10 | x19 ^ x11 | x19 ^ x12 | x19 ^ x13 | x19 ^ x14 | x19 ^ x15 | x19 ^ x16 | x19 ^ x17 | x19 ^ x18 |
| 5 | x18 ^ x5 | x18 ^ x6 | x18 ^ x7 | x18 ^ x8 | x18 ^ x9 | x18 ^ x10 | x18 ^ x11 | x18 ^ x12 | x18 ^ x13 | x18 ^ x14 | x18 ^ x15 | x18 ^ x16 | x18 ^ x17 |
| 6 | x17 ^ x4 | x17 ^ x5 | x17 ^ x6 | x17 ^ x7 | x17 ^ x8 | x17 ^ x9 | x17 ^ x10 | x17 ^ x11 | x17 ^ x12 | x17 ^ x13 | x17 ^ x14 | x17 ^ x15 | x17 ^ x16 |
| 7 | x16 ^ x3 | x16 ^ x4 | x16 ^ x5 | x16 ^ x6 | x16 ^ x7 | x16 ^ x8 | x16 ^ x9 | x16 ^ x10 | x16 ^ x11 | x16 ^ x12 | x16 ^ x13 | x16 ^ x14 | x16 ^ x15 |

FIG. 18

| loop/lane | 0 | 1 | 2 | 3 | 4 | 5 | 6 | 7 | S | V | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|---|
| fib | 23 | 23 | 23 | 23 | 23 | 23 | 23 | 23 | 23 | A | 23 | 23 | 23 | 23 | 23 | 23 | 23 | 23 | 23 | 23 | 23 | 23 |
| 0 | L | H | H | H | H | H | H | H | H | A | H | H | H | H | H | H | H | H | H | H | H | H |
| 1 | H | L | H | H | H | H | H | H | 9 | A | H | L | H | H | H | H | H | H | H | H | H | H |
| 2 | H | H | L | H | H | H | H | 8 | 9 | A | H | H | L | H | H | H | H | H | H | H | H | H |
| 3 | H | H | H | L | H | H | 7 | 8 | 9 | A | H | H | H | L | H | H | H | H | H | H | H | H |
| 4 | 1 | H | H | H | L | H | 7 | 8 | 9 | A | 11 | 12 | H | H | L | H | H | H | H | H | H | H |
| 5 | 1 | H | H | H | L | 6 | 7 | 8 | H | A | 11 | 12 | 13 | H | H | L | H | H | H | H | H | H |
| 6 | 1 | L | H | H | H | 6 | H | H | H | A | 11 | 12 | 13 | 14 | H | H | L | H | H | H | H | H |
| 7 | 1 | H | H | 4 | H | H | H | H | H | A | 11 | 12 | 13 | 14 | 15 | 16 | 17 | 18 | H | H | L | H |
| 8 | H | H | 3 | 4 | 5 | 6 | 7 | H | L | A | L | H | H | 14 | 15 | 16 | 17 | H | H | L | H | H |
| 9 | H | H | 3 | 4 | 5 | 6 | H | H | H | A | H | H | H | H | 15 | 16 | 17 | H | H | H | L | H |
| 10 | H | H | H | 4 | 5 | 6 | 7 | H | H | A | L | H | H | H | 15 | 16 | 17 | 18 | H | H | H | L |

VALID LANE TRAINING

CROSS-REFERENCE TO RELATED APPLICATIONS

This application is a national stage application under 35 U.S.C. § 371 of PCT International Application Serial No. PCT/US2015/052512, filed on Sep. 26, 2015, and entitled VALID LANE TRAINING. The disclosure of the prior application is considered part of and is hereby incorporated by reference in its entirety in the disclosure of this application.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 16 is a representation of example signaling on an example MCPL during link training, in accordance with one embodiment.

FIG. 20 is a table illustrating an example implementation of crosstalk stress tests.

FIG. 21 is a table illustrating an example implementation of crosstalk stress tests to include testing of a valid lane of an example MCPL.

Like reference numbers and designations in the various drawings indicate like elements.

DETAILED DESCRIPTION

Figure 1:
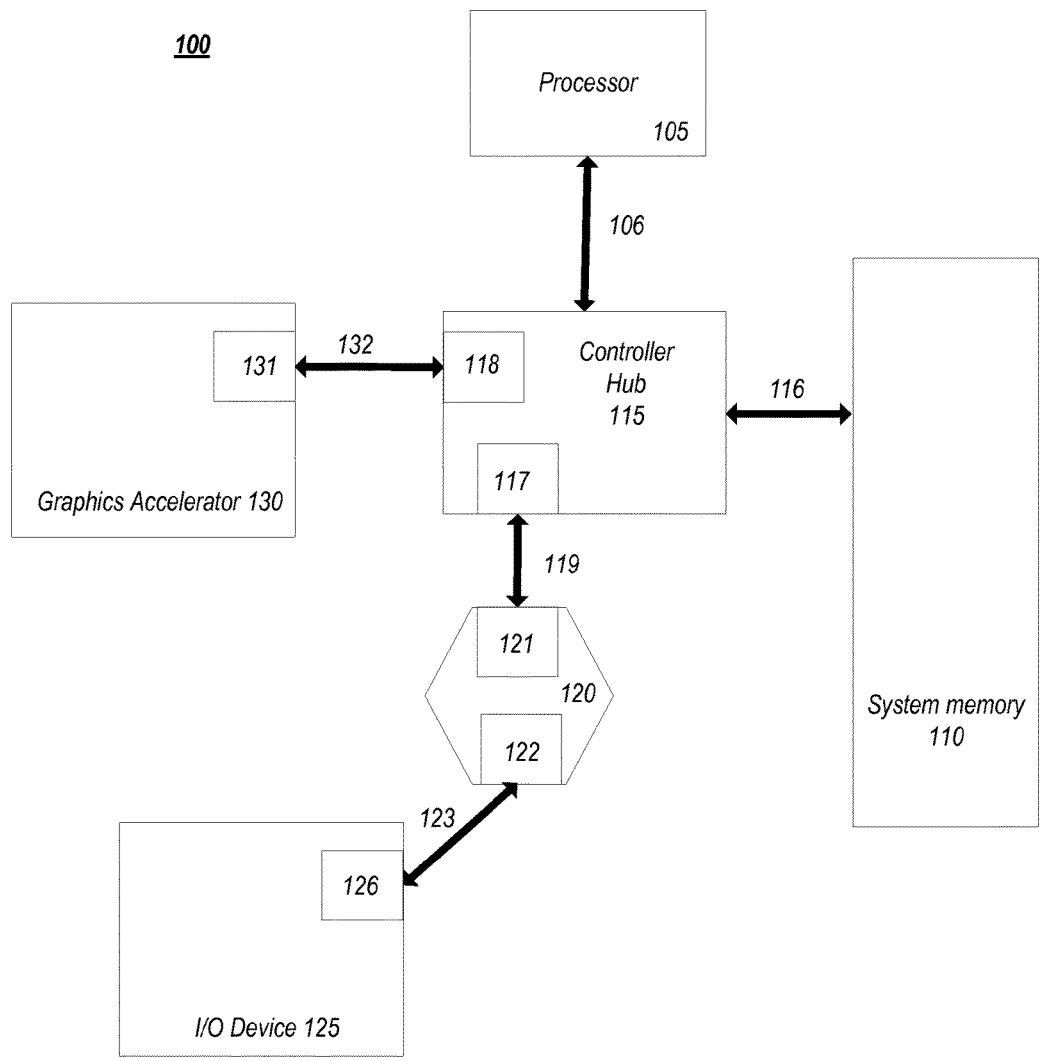
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. One or more components of the system 100 can be provided with logic to implement the features described herein.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
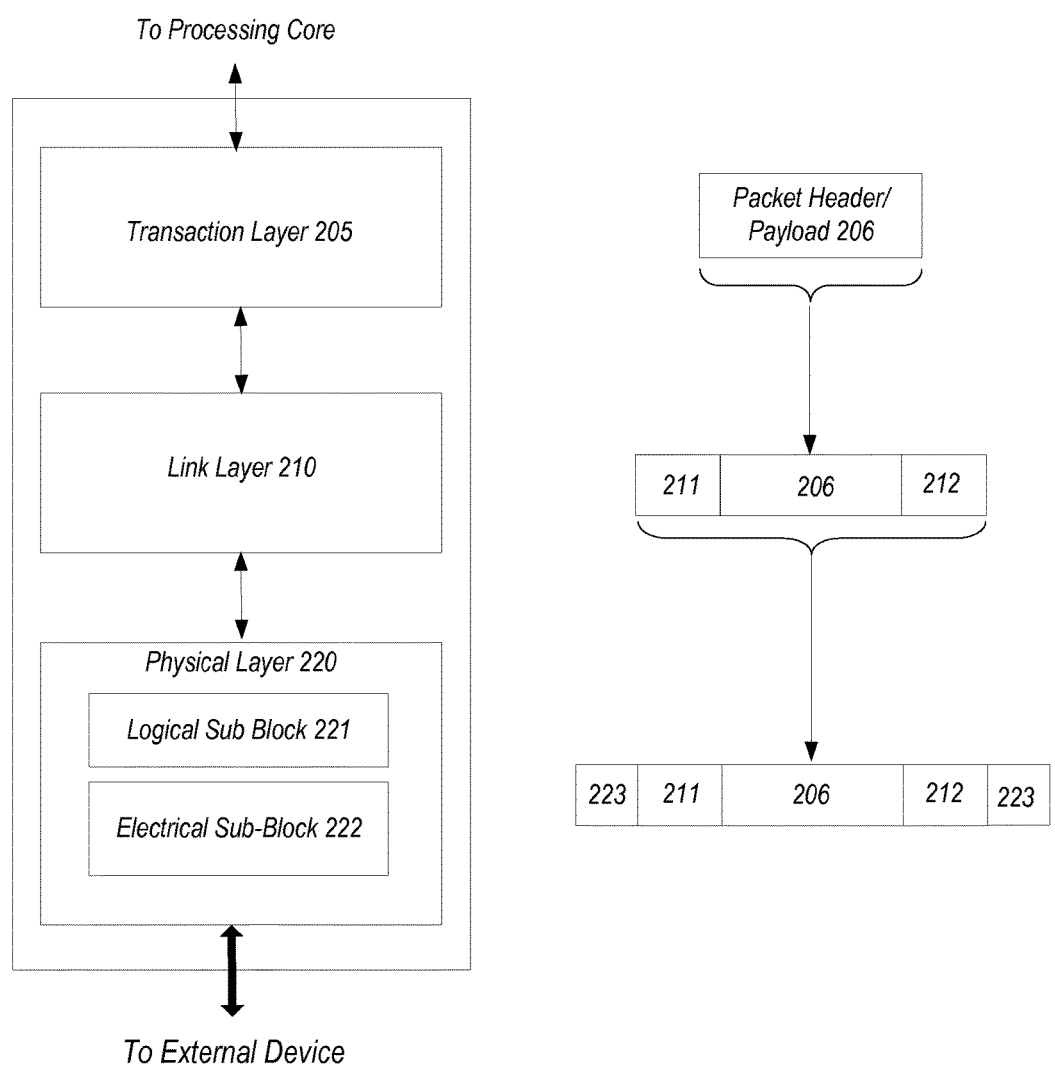
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
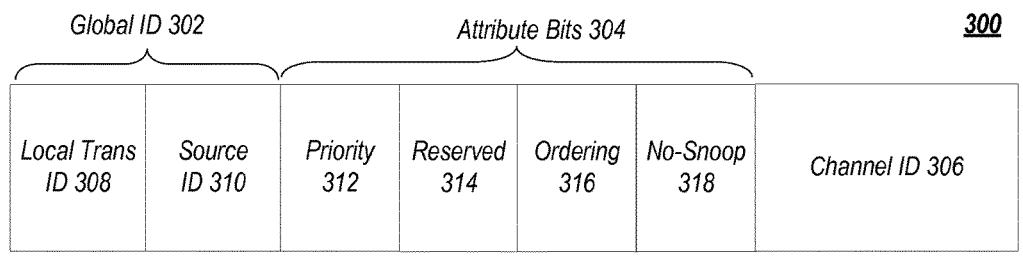
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
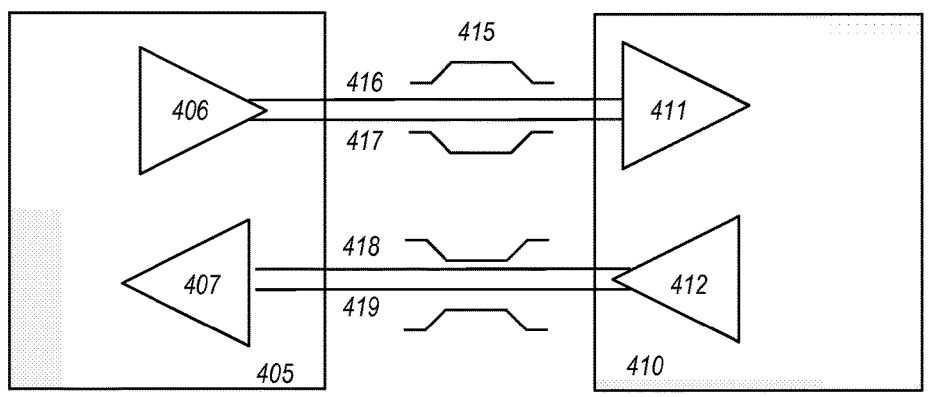
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 5:
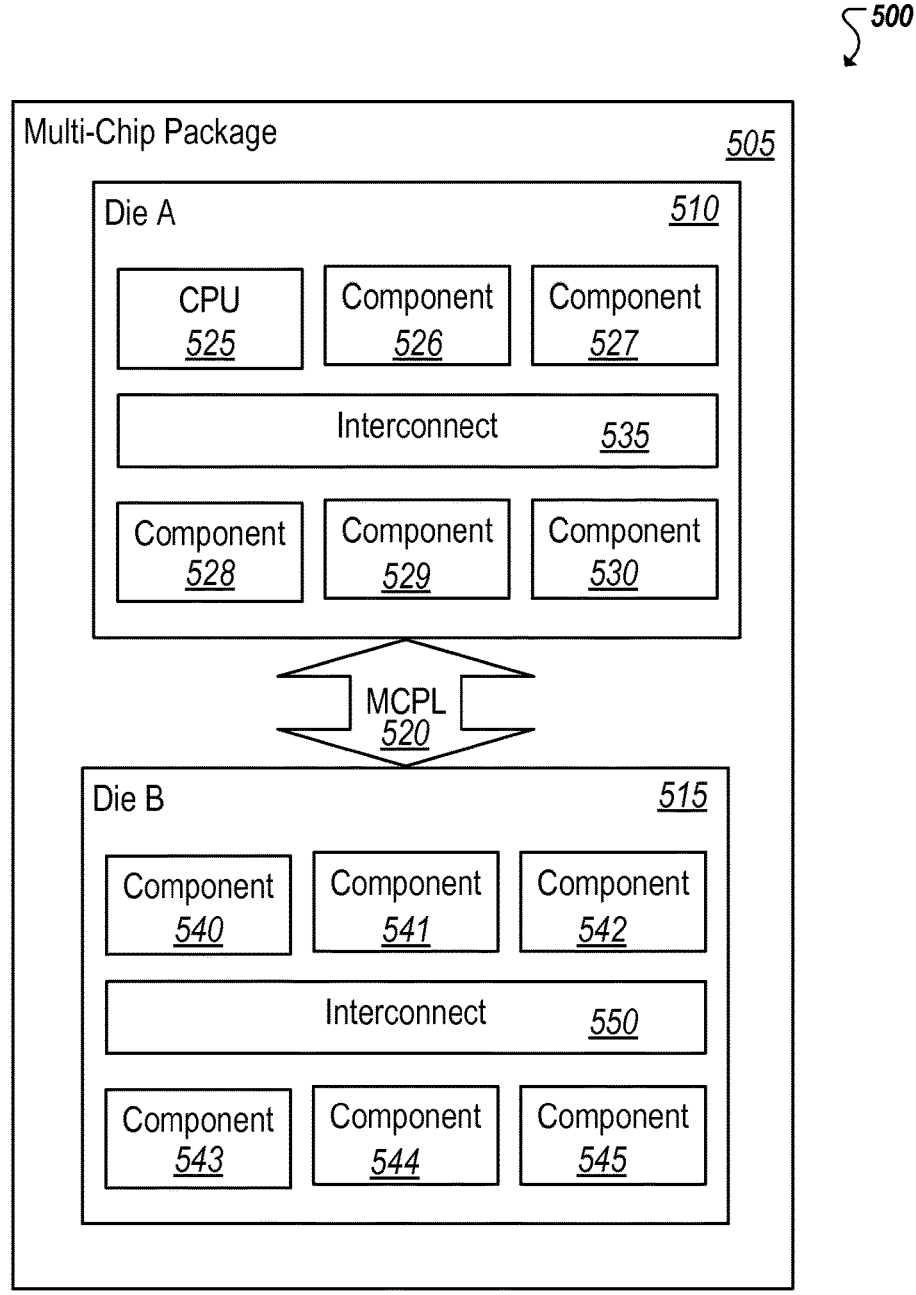
FIG. 5 illustrates an embodiment of a multichip package.

FIG. 5 is a simplified block diagram 500 illustrating an example multi-chip package 505 that includes two or more chips, or dies, (e.g., 510, 515) communicatively connected using an example multi-chip package link (MCPL) 520. While FIG. 5 illustrates an example of two (or more) dies that are interconnected using an example MCPL 520, it should be appreciated that the principles and features described herein regarding implementations of an MCPL can be applied to any interconnect or link connecting a die (e.g., 510) and other components, including connecting two or more dies (e.g., 510, 515), connecting a die (or chip) to another component off-die, connecting a die to another device or die off-package (e.g., 505), connecting die to a BGA package, implementation of a Patch on Interposer (POINT), among potentially other examples.

Generally, a multichip package (e.g., 505) can be an electronic package where multiple integrated circuits (ICs), semiconductor dies or other discrete components (e.g., 510, 515) are packaged onto a unifying substrate (e.g., silicon or other semiconductor substrate), facilitating the combined components' use as a single component (e.g., as though a larger IC). In some instances, the larger components (e.g., dies 510, 515) can themselves be IC systems, such as systems on chip (SoC), multiprocessor chips, or other components that include multiple components (e.g., 525-530 and 540-545) on the device, for instance, on a single die (e.g., 510, 515). Multichip packages 505 can provide flexibility for building complex and varied systems from potentially multiple discrete components and systems. For instance, each of dies 510, 515 may be manufactured or otherwise provided by two different entities, with the silicon substrate of the package 505 provided by yet a third entity, among many other examples. Further, dies and other components within a multichip package 505 can themselves include interconnect or other communication fabrics (e.g., 535, 550) providing the infrastructure for communication between components (e.g., 525-530 and 540-545) within the device (e.g., 510, 515 respectively). The various components and interconnects (e.g., 535, 550) may potentially support or use multiple different protocols. Further, communication between dies (e.g., 510, 515) can potentially include transactions between the various components on the dies over multiple different protocols. Designing mechanisms to provide communication between chips (or dies) on a multichip package can be challenging, with traditional solutions employing highly specialized, expensive, and package-specific solutions based on the specific combinations of components (and desired transactions) sought to be interconnected.

The examples, systems, algorithms, apparatus, logic, and features described within this Specification can address at least some of the issues identified above, including potentially many others not explicitly mentioned herein. For instance, in some implementations, a high bandwidth, low power, low latency interface can be provided to connect a host device (e.g., a CPU) or other device to a companion chip that sits in the same package as the host. Such a multichip package link (MCPL) can support multiple package options, multiple I/O protocols, as well as Reliability, Availability, and Serviceability (RAS) features. Further, the physical layer (PHY) can include an electrical layer and logic layer and can support longer channel lengths, including channel lengths up to, and in some cases exceeding, approximately 45 mm. In some implementations, an example MCPL can operate at high data rates, including data rates exceeding 8-10 Gb/s.

In one example implementation of an MCPL, a PHY electrical layer can improve upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples.

In one example implementation of an MCPL, a PHY logical layer can be implemented that can further assist (e.g., electrical layer features) in extending the data rate and channel configuration while also enabling the interconnect to route multiple protocols across the electrical layer. Such implementations can provide and define a modular common physical layer that is protocol agnostic and architected to work with potentially any existing or future interconnect protocol.

Figure 6:
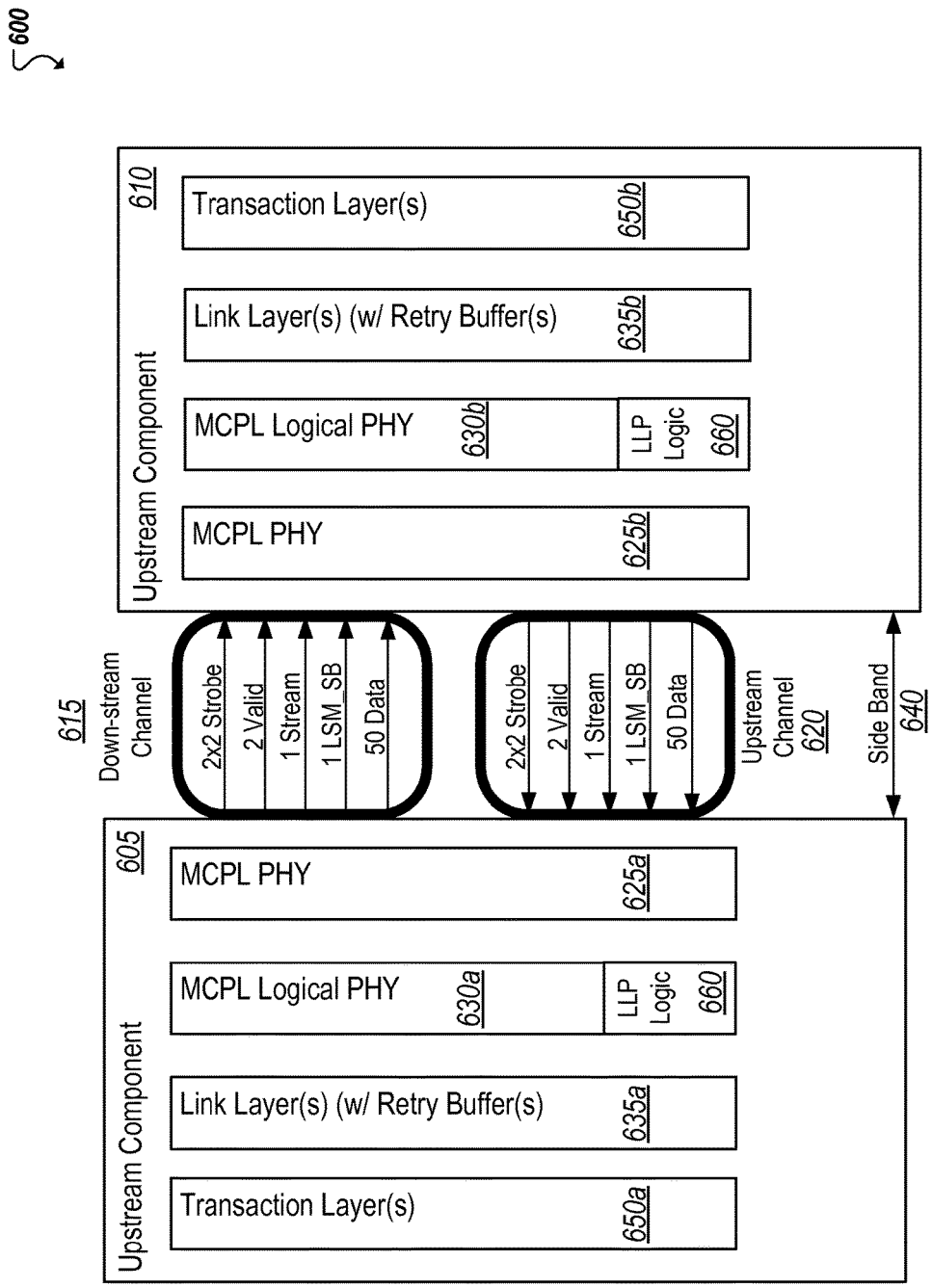
FIG. 6 is a simplified block diagram of a multichip package link (MCPL).

Turning to FIG. 6, a simplified block diagram 600 is shown representing at least a portion of a system including an example implementation of a multichip package link (MCPL). An MCPL can be implemented using physical electrical connections (e.g., wires implemented as lanes) connecting a first device 605 (e.g., a first die including one or more sub-components) with a second device 610 (e.g., a second die including one or more other sub-components). In the particular example shown in the high-level representation of diagram 600, all signals (in channels 615, 620) can be unidirectional and lanes can be provided for the data signals to have both an upstream and downstream data transfer. While the block diagram 600 of FIG. 6, refers to the first component 605 as the upstream component and the second component 610 as the downstream components, and physical lanes of the MCPL used in sending data as a downstream channel 615 and lanes used for receiving data (from component 610) as an upstream channel 620, it should be appreciated that the MCPL between devices 605, 610 can be used by each device to both send and receive data between the devices.

In one example implementation, an MCPL can provide a physical layer (PHY) including the electrical MCPL PHY 625a,b (or, collectively, 625) and executable logic implementing MCPL logical PHY 630a,b (or, collectively, 630). Electrical, or physical, PHY 625 can provide the physical connection over which data is communicated between devices 605, 610. Signal conditioning components and logic can be implemented in connection with the physical PHY 625 in order to establish high data rate and channel configuration capabilities of the link, which in some applications can involve tightly clustered physical connections at lengths of approximately 45 mm or more. The logical PHY 630 can include logic for facilitating clocking, link state management (e.g., for link layers 635a, 635b), and protocol multiplexing between potentially multiple, different protocols used for communications over the MCPL.

In one example implementation, physical PHY 625 can include, for each channel (e.g., 615, 620) a set of data lanes, over which in-band data can be sent. In this particular example, 50 data lanes are provided in each of the upstream and downstream channels 615, 620, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 640, which, in some examples, can be a bi-directional lower frequency control signal link used to coordinate state transitions and other attributes of the MCPL connecting devices 605, 610, among other examples.

In some implementations, in-band data (and other data) sent over the MCPL can be scrambled. In one example, the data can be scrambled, on each lane, using a pseudo random binary sequence (PRBS). In some implementations, the PRBS can be generated to be scrambled with outbound data using a linear feedback shift register (LFSR). A receiving device can unscramble the data to view the data in the clear, among other examples.

As noted above, multiple protocols can be supported using an implementation of MCPL. Indeed, multiple, independent transaction layers 650a, 650b can be provided at each device 605, 610. For instance, each device 605, 610 may support and utilize two or more protocols, such as PCI, PCIe, QPI, Intel In-Die Interconnect (IDI), among others. IDI is a coherent protocol used on-die to communicate between cores, Last Level Caches (LLCs), memory, graphics, and IO controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 630 can support multiplexing between these multiple protocols on an MCPL. For instance, the dedicated stream lane can be used to assert an encoded stream signal that identifies which protocol is to apply to data sent substantially concurrently on the data lanes of the channel. Further, logical PHY 630 can be used to negotiate the various types of link state transitions that the various protocols may support or request. In some instances, LSM_SB signals sent over the channel's dedicated LSM_SB lane can be used, together with side band link 640 to communicate and negotiate link state transitions between the devices 605, 610. Further, link training, error detection, skew detection, de-skewing, and other functionality of traditional interconnects can be replaced or governed, in part using logical PHY 630. For instance, valid signals sent over one or more dedicated valid signal lanes in each channel can be used to signal link activity, detect skew, link errors, and realize other features, among other examples. In the particular example of FIG. 6, multiple valid lanes are provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 630 can be used to negotiate and manage link control signals sent between devices connected by the MCPL. In some implementations, logical PHY 630 can include link layer packet (LLP) generation logic 660 that can be used to send link layer control messages over the MCPL (i.e., in band). Such messages can be sent over data lanes of the channel, with the stream lane identifying that the data is link layer-to-link layer messaging, such as link layer control data, among other examples. Link layer messages enabled using LLP module 660 can assist in the negotiation and performance of link layer state transitioning, power management, loopback, disable, re-centering, scrambling, among other link layer features between the link layers 635a, 635b of devices 605, 610 respectively.

Figure 7:
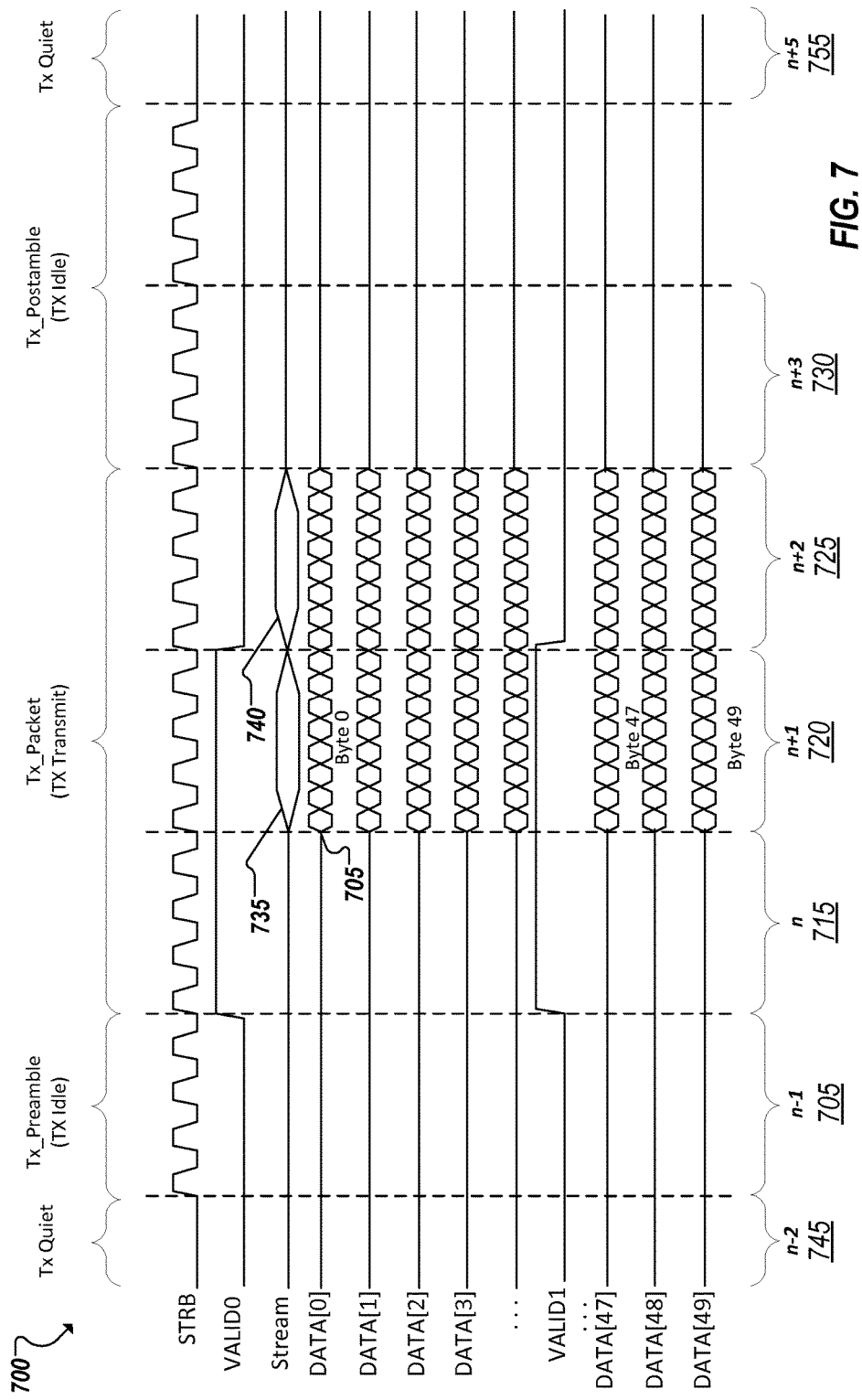
FIG. 7 is a representation of example signaling on an example MCPL.

Turning to FIG. 7, a diagram 700 is shown representing example signaling using a set of lanes (e.g., 615, 620) in a particular channel of an example MCPL. In the example of FIG. 7, two clusters of twenty-five (25) data lanes are provided for fifty (50) total data lanes in the channel. A portion of the lanes are shown, while others (e.g., DATA[4-46] and a second strobe signal lane (STRB)) are omitted (e.g., as redundant signals) for convenience in illustrating the particular example. When the physical layer is in an active state (e.g., not powered off or in a low power mode (e.g., an L1 state)), strobe lanes (STRB) can be provided with a synchronous clock signal. In some implementations, data can be sent on both the rising and falling edges of the strobe. Each edge (or half clock cycle) can demarcate a unit interval (UI). Accordingly, in this example, a bit (e.g., 705) can be sent on each lane, allowing for a byte to be sent every 8UI. A byte time period 710 can be defined as 8UI, or the time for sending a byte on a single one of the data lanes (e.g., DATA[0-49]).

In some implementations, a valid signal, sent on one or more dedicated valid signal channels (e.g., VALID0, VALID1), can serve as a leading indicator for the receiving device to identify, when asserted (high), to the receiving device, or sink, that data is being sent from the sending device, or source, on data lanes (e.g., DATA[0-49]) during the following time period, such as a byte time period 710. Alternatively, when the valid signal is low, the source indicates to the sink that the sink will not be sending data on the data lanes during the following time period. Accordingly, when the sink logical PHY detects that the valid signal is not asserted (e.g., on lanes VALID0 and VALID1), the sink can disregard any data that is detected on the data lanes (e.g., DATA[0-49]) during the following time period. For instance, cross talk noise or other bits may appear on one or more of the data lanes when the source, in fact, is not sending any data. By virtue of a low, or non-asserted, valid signal during the previous time period (e.g., the previous byte time period), the sink can determine that the data lanes are to be disregarded during the following time period.

Data sent on each of the lanes of the MCPL can be strictly aligned to the strobe signal. A time period can be defined based on the strobe, such as a byte time period, and each of these periods can correspond to a defined window in which signals are to be sent on the data lanes (e.g., DATA[0-49]), the valid lanes (e.g., VALID1, VALID2), and stream lane (e.g., STREAM). Accordingly, alignment of these signals can enable identification that a valid signal in a previous time period window applies to data in the following time period window, and that a stream signal applies to data in the same time period window. The stream signal can be an encoded signal (e.g., 1 byte of data for a byte time period window), that is encoded to identify the protocol that applies to data being sent during the same time period window.

To illustrate, in the particular example of FIG. 7, a byte time period window is defined. A valid is asserted at a time period window n (715), before any data is injected on data lanes DATA[0-49]. At the following time period window n+1 (720) data is sent on at least some of the data lanes. In this case, data is sent on all fifty data lanes during n+1 (720). Because a valid was asserted for the duration of the preceding time period window n (715), the sink device can validate the data received on data lanes DATA[0-49] during time period window n+1 (720). Additionally, the leading nature of the valid signal during time period window n (715) allows the receiving device to prepare for the incoming data.

Continuing with the example of FIG. 7, the valid signal remains asserted (on VALID1 and VALID2) during the duration of time period window n+1 (720), causing the sink device to expect the data sent over data lanes DATA[0-49] during time period window n+2 (725). If the valid signal were to remain asserted during time period window n+2 (725), the sink device could further expect to receive (and process) additional data sent during an immediately subsequent time period window n+3 (730). In the example of FIG. 7, however, the valid signal is de-asserted during the duration of time period window n+2 (725), indicating to the sink device that no data will be sent during time period window n+3 (730) and that any bits detected on data lanes DATA [0-49] should be disregarded during time period window n+3 (730).

As noted above, multiple valid lanes and strobe lanes can be maintained per channel. This can assist, among other advantages, with maintaining circuit simplicity and synchronization amid the clusters of relatively lengthy physical lanes connecting the two devices. In some implementations, a set of data lanes can be divided into clusters of data lanes. For instance, in the example of FIG. 7, data lanes DATA[0-49] can be divided into two twenty-five lane clusters and each cluster can have a dedicated valid and strobe lane. For instance, valid lane VALID1 can be associated with data lanes DATA[0-24] and valid lane VALID2 can be associated with data lanes DATA[25-49]. The signals on each "copy" of the valid and strobe lanes for each cluster can be identical.

As introduced above, data on stream lane STREAM can be used to indicate to the receiving logical PHY what protocol is to apply to corresponding data being sent on data lanes data lanes DATA[0-49]. In the example of FIG. 7, a stream signal is sent on STREAM during the same time period window as data on data lanes DATA[0-49] to indicate the protocol of the data on the data lanes. In alternative implementations, the stream signal can be sent during a preceding time period window, such as with corresponding valid signals, among other potential modifications. However, continuing with the example of FIG. 7, a stream signal 735 is sent during time period window n+1 (720) that is encoded to indicate the protocol (e.g., PCIe, PCI, IDI, QPI, etc.) that is to apply to the bits sent over data lanes DATA[0-49] during time period window n+1 (720). Similarly, another stream signal 740 can be sent during the subsequent time period window n+2 (725) to indicate the protocol that applies to the bits sent over data lanes DATA [0-49] during time period window n+2 (725), and so on. In some cases, such as the example of FIG. 7 (where both stream signals 735, 740 have the same encoding, binary FF), data in sequential time period windows (e.g., n+1 (720) and n+2 (725)) can belong to the same protocol. However, in other cases, data in sequential time period windows (e.g., n+1 (720) and n+2 (725)) can be from different transactions to which different protocols are to apply, and stream signals (e.g., 735, 740) can be encoded accordingly to identify the different protocols applying to the sequential bytes of data on the data lanes (e.g., DATA[0-49]), among other examples.

In some implementations, a low power or idle state can be defined for the MCPL. For instance, when neither device on the MCPL is sending data, the physical layer (electrical and logical) of MCPL can go to an idle or low power state. For instance, in the example of FIG. 7, at time period window n−2 (745), the MCPL is in a quiet or idle state and the strobe is disabled to save power. The MCPL can transition out of low-power or idle mode, awaking the strobe at time period window time period window n−1 (e.g., 705). The strobe can complete a transmission preamble (e.g., to assist in waking and synchronizing each of the lanes of the channel, as well as the sink device), beginning the strobe signal prior to any other signaling on the other non-strobe lanes. Following this time period window n−1 (705), the valid signal can be asserted at time period window n (715) to notify the sink that data is forthcoming in the following time period window n+1 (720), as discussed above.

The MCPL may re-enter a low power or idle state (e.g., an L1 state) following the detection of idle conditions on the valid lanes, data lanes, and/or other lanes of the MCPL channel (or, simply, "MCPL"). For instance, no signaling may be detected beginning at time period window n+3 (730) and going forward. Logic on either the source or sink device can initiate transition back into a low power state leading again (e.g., time period window n+5 (755)) to the strobe going idle in a power savings mode, among other examples and principles (including those discussed later herein).

Electrical characteristics of the physical PHY can include one or more of single-ended signaling, half-rate forwarded clocking, matching of interconnect channel as well as on-chip transport delay of transmitter (source) and receiver (sink), optimized electrostatic discharge (ESD) protection, pad capacitance, among other features. Further, an MCPL can be implemented to achieve higher data rate (e.g., approaching 16 Gb/s) and energy efficiency characteristics than traditional package I/O solutions.

Figure 8:
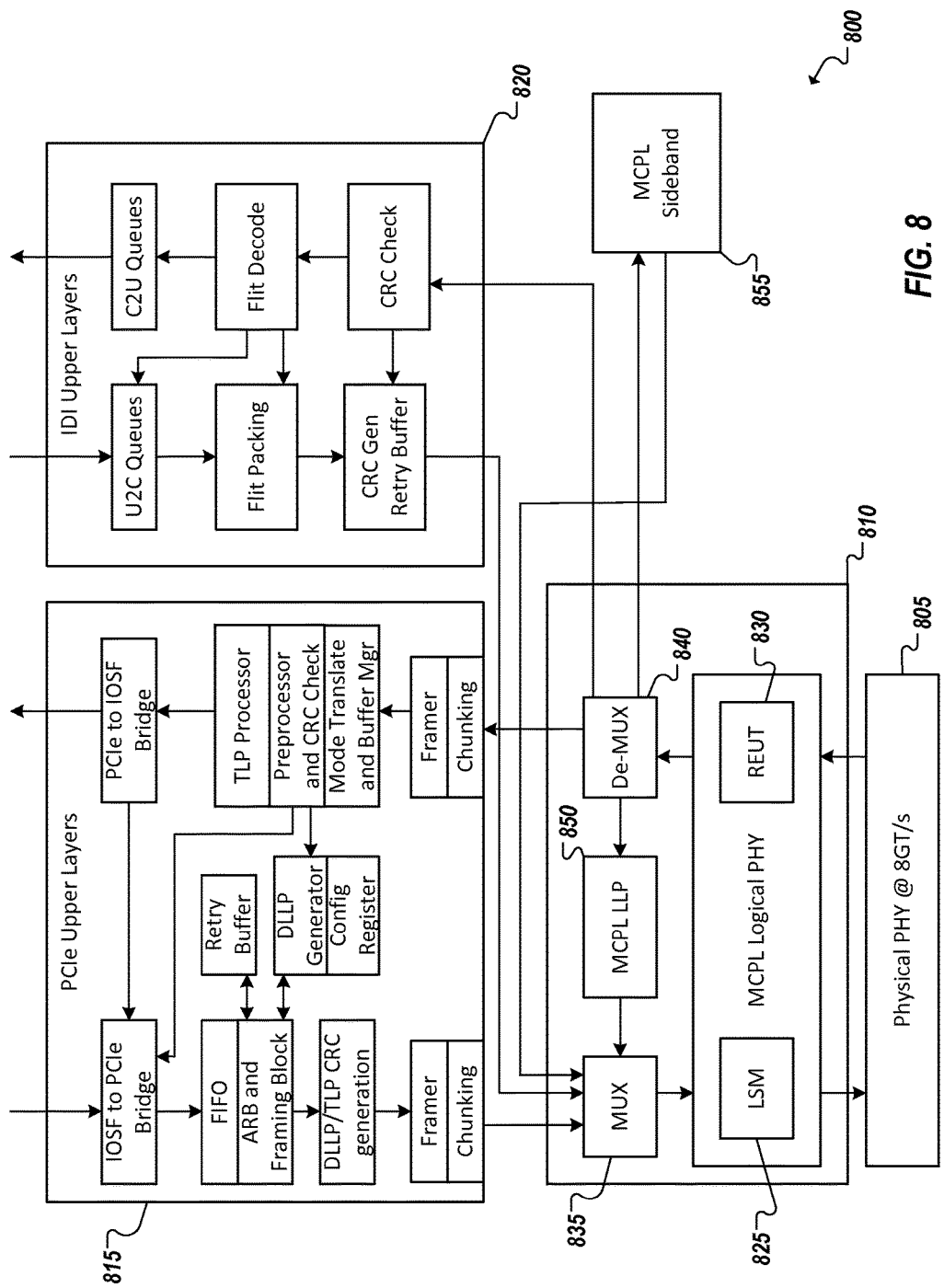
FIG. 8 is a simplified block diagram of an MCPL.

Turning to FIG. 8, a simplified block diagram 800 is shown illustrating an example logical PHY of an example MCPL. A physical PHY 805 can connect to a die that includes logical PHY 810 and additional logic supporting a link layer of the MCPL. The die, in this example, can further include logic to support multiple different protocols on the MCPL. For instance, in the example of FIG. 8, PCIe logic 815 can be provided as well as IDI logic 820, such that the dies can communicate using either PCIe or IDI over the same MCPL connecting the two dies, among potentially many other examples, including examples where more than two protocols or protocols other than PCIe and IDI are supported over the MCPL. Various protocols supported between the dies can offer varying levels of service and features.

Logical PHY 810 can include link state machine management logic 825 for negotiating link state transitions in connection with requests of upper layer logic of the die (e.g., received over PCIe or IDI). Logical PHY 810 can further include link testing and debug logic (e.g., 830) ion some implementations. As noted above, an example MCPL can support control signals that are sent between dies over the MCPL to facilitate protocol agnostic, high performance, and power efficiency features (among other example features) of the MCPL. For instance, logical PHY 810 can support the generation and sending, as well as the receiving and processing of valid signals, stream signals, and LSM sideband signals in connection with the sending and receiving of data over dedicated data lanes, such as described in examples above.

In some implementations, multiplexing (e.g., 835) and demultiplexing (e.g., 840) logic can be included in, or be otherwise accessible to, logical PHY 810. For instance, multiplexing logic (e.g., 835) can be used to identify data (e.g., embodied as packets, messages, etc.) that is to be sent out onto the MCPL. The multiplexing logic 835 can identify the protocol governing the data and generate a stream signal that is encoded to identify the protocol. For instance, in one example implementation, the stream signal can be encoded as a byte of two hexadecimal symbols (e.g., IDI: FFh; PCIe: F0h; LLP: AAh; sideband: 55h; etc.), and can be sent during the same window (e.g., a byte time period window) of the data governed by the identified protocol. Similarly, demultiplexing logic 840 can be employed to interpret incoming stream signals to decode the stream signal and identify the protocol that is to apply to data concurrently received with the stream signal on the data lanes. The demultiplexing logic 840 can then apply (or ensure) protocol-specific link layer handling and cause the data to be handled by the corresponding protocol logic (e.g., PCIe logic 815 or IDI logic 820).

Logical PHY 810 can further include link layer packet logic 850 that can be used to handle various link control functions, including power management tasks, loopback, disable, re-centering, scrambling, etc. LLP logic 850 can facilitate link layer-to-link layer messages over MCLP, among other functions. Data corresponding to the LLP signaling can be also be identified by a stream signal sent on a dedicated stream signal lane that is encoded to identify that the data lanes LLP data. Multiplexing and demultiplexing logic (e.g., 835, 840) can also be used to generate and interpret the stream signals corresponding to LLP traffic, as well as cause such traffic to be handled by the appropriate die logic (e.g., LLP logic 850). Likewise, as some implementations of an MCLP can include a dedicated sideband (e.g., sideband 855 and supporting logic), such as an asynchronous and/or lower frequency sideband channel, among other examples.

Logical PHY logic 810 can further include link state machine management logic that can generate and receive (and use) link state management messaging over a dedicated LSM sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two die or chips connected by the link, among other examples. Providing a dedicated LSM sideband lane can, in some examples, allow for traditional squelch and received detect circuits of an analog front end (AFE) to be eliminated, among other example benefits.

Figure 9:
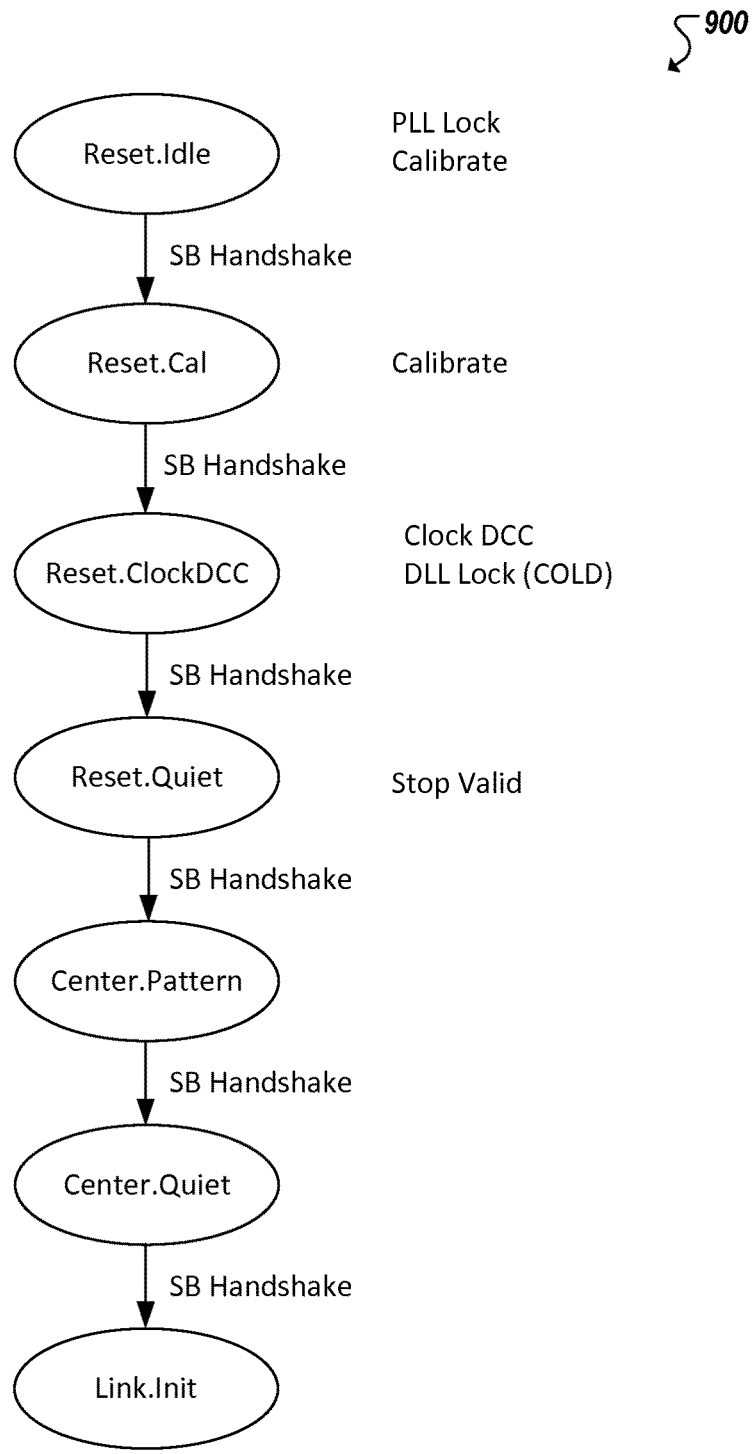
FIG. 9 is a representation of signaling to enter a low power state.

FIG. 9 is a simplified block diagram 900 illustrating an example flow in a transition between an active state (e.g., L0) and a low-power, or idle, state (e.g., L1). In this particular example, a first device 905 and a second device 910 are communicatively coupled using an MCPL. While in the active state, data is transmitted over the lanes of the MCPL (e.g., DATA, VALID, STREAM, etc.). Link layer packets (LLPs) can be communicated over the lanes (e.g., data lanes, with the stream signal indicating that the data is LLP data), to assist in facilitating link state transitions. For instance, LLPs can be sent between the first and second devices 905, 910 to negotiate entry from L0 into L1. For instance, upper layer protocols supported by the MCPL can communicate that entry into L1 (or another state) is desired and the upper layer protocols can cause LLPs to be sent over the MCPL to facilitate a link layer handshake to cause the physical layer to enter L1. For instance, FIG. 9 shows at least a portion of LLPs sent including an "Enter L1" request LLP sent from the second (upstream) device 910 to the first (downstream) device 905. In some implementations, and upper level protocols, the downstream port does not initiate the entry into L1. The receiving first device 905 can send a "Change to L1" request LLP in response, which the second device 910 can acknowledge through a "Change to L1" acknowledgement (ACK) LLP, among other examples. Upon detecting completion of the handshake, the logical PHY can cause a sideband signal to be asserted on a dedicated sideband link to acknowledge that the ACK was received and that the device (e.g., 905) is ready for and expecting entry into L1. For instance, the first device 905 can assert a sideband signal 915 sent to the second device 910 to confirm receipt of the final ACK in the link layer handshake. Additionally, the second device 910 can also assert a sideband signal in response to sideband signal 915 to notify the first device 905 of the first device's sideband ACK 905. With the link layer control and sideband handshakes completed, the MCPL PHY can be transitioned into the L1 state causing all lanes of the MCPL to be put into idle power savings mode, including respective MCPL strobes of the 920, 925 of the devices 905, 910. The L1 can be exited upon upper level layer logic of one of the first and second devices 905, 910 requesting re-entry into L0, for instance, in response to detecting data to be sent to the other device over the MCPL.

As noted above, in some implementations, an MCPL can facilitate communication between two devices supporting potentially multiple different protocols, and the MCPL can facilitate communications according to potentially any one of the multiple protocols over the lanes of the MCPL. Facilitating multiple protocols, however, can complicate entry and reentry into at least some link states. For instance, while some traditional interconnects have a single upper layer protocol assuming the role of master in state transitions, an implementation of MCPL with multiple different protocols effectively involves multiple masters. As an example, as shown in FIG. 9, each of PCIe and IDI can be supported between two devices 905, 910 over an implementation of an MCPL. For instance, placing the physical layer into an idle or low power state may be conditioned on permission first being obtained from each of the supported protocols (e.g., both PCIe and IDI).

In some instances, entry into L1 (or another state) may be requested by only one of the multiple, supported protocols supported for an implementation of an MCPL. While there may be a likelihood that the other protocols will likewise request entry into the same state (e.g., based on identifying similar conditions (e.g., little or no traffic) on the MCPL), the logical PHY can wait until permission or instructions are received from each upper layer protocol before actually facilitating the state transition. The logical PHY can track which upper layer protocols have requested the state change (e.g., performed a corresponding handshake) and trigger the state transition upon identifying that each of the protocols have requested the particular state change, such as a transition from L0 to L1 or another transition that would affect or interfere with other protocols' communications. In some implementations, protocols can be blind as to their at least partial dependence on other protocols in the system. Further, in some instances, a protocol may expect a response (e.g., from the PHY) to a request to enter a particular state, such as a confirmation or rejection of the requested state transition. Accordingly, in such instances, while waiting for permission from other supported protocols for entry into an idle link state, the logical PHY can generate synthetic responses to a request to enter the idle state to "trick" the requesting upper layer protocol into believing that a particular state has been entered (when, in reality, the lanes are still active, at least until the other protocols also request entry into the idle state). Among other potential advantages, this can simplify coordinating entry into the low power state between multiple protocols, among other examples.

Figure 10:
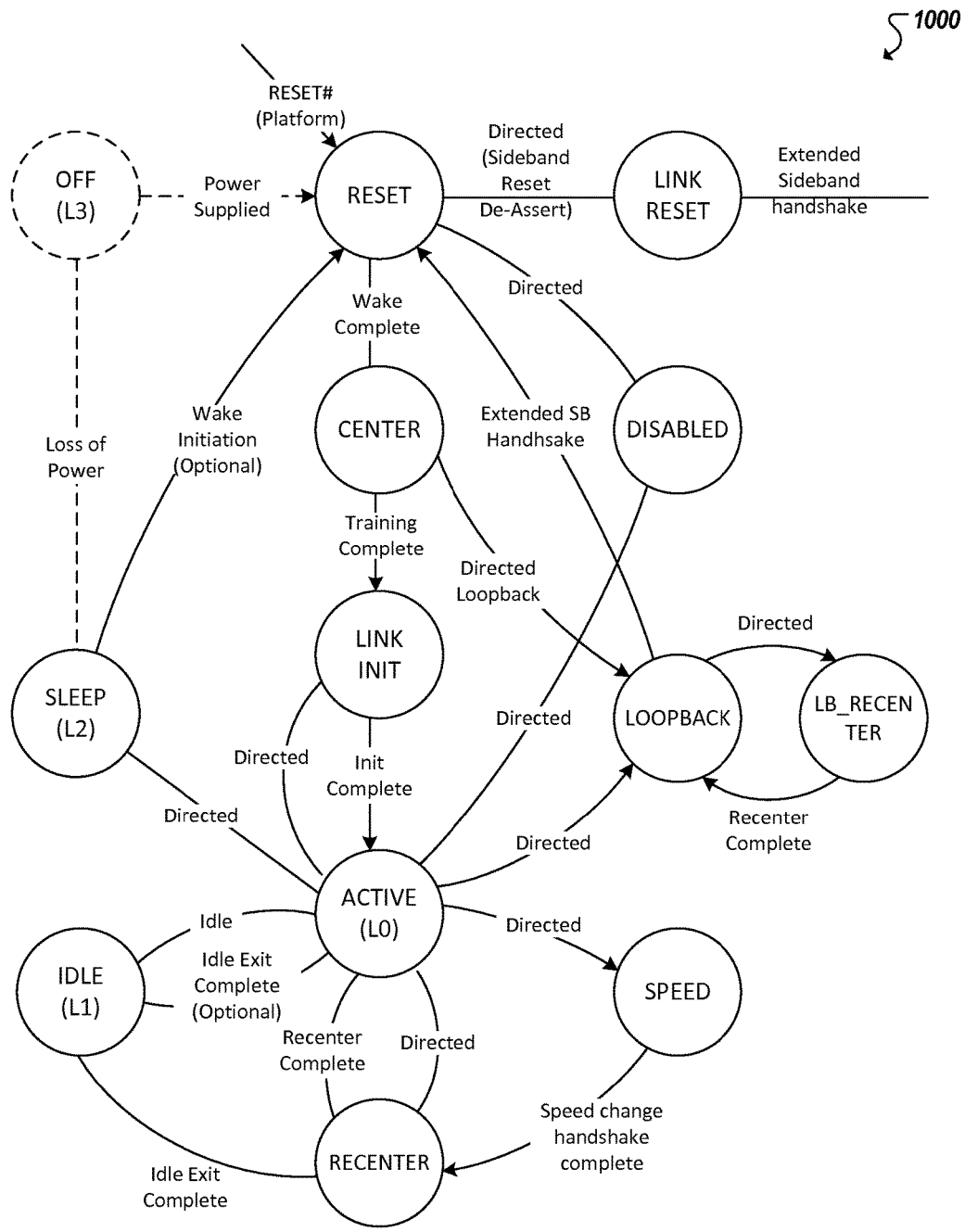
FIG. 10 is a representation of a portion of an example link state machine.

Turning to FIG. 10, a simplified link state machine transition diagram 1000 is shown together with sideband handshaking utilized between the state transitions. For instance, a Reset.Idle state (e.g., where phase lock loop (PLL) lock calibration is performed) can transition, through a sideband handshake, to a Reset.Cal state (e.g., where the link is further calibrated). Reset.Cal can transition, through a sideband handshake, to a Reset.ClockDCC state (e.g., where duty cycle correction (DCC) and delay-locked looping (DLL) lock can be performed). An additional handshake can be performed to transition from Reset.ClockDCC to a Reset.Quiet state (e.g., to deassert the Valid signal). To assist in alignment of signaling on the lanes of the MCPL, the lanes can be centered through a Center.Pattern state.

In some implementations, during the Center.Pattern state, the transmitter can generate training patterns or other data. The training patterns can be used, for instance, by data lanes of the MCPL, to assist in aligning and optimizing sampling on the lanes of the MCPL, such as the data lanes. For instance, the lanes can be centered through a Center.Pattern state defined by the link state machine (LSM). In one example, during centering, the receiver device can condition its receiver circuitry to receive such training patterns, for instance, by setting the phase interpolator position and vref position and setting the comparator. The receiver can continuously compare the patterns received with expected patterns and store the result in a register. After one set of patterns are complete, the receiver can increment the phase interpolator setting keeping the reference voltage (vref) the same. The test pattern generation and comparison process can continue iteratively and new compare results can be stored in the register with the procedure repeatedly stepping through all phase interpolator values and through all values of vref. The results can be compared and analyzed, for instance, by the logical PHY and/or system management software, to determine optimal conditions for operation of the plurality of lanes of the link. Such conditions can include optimal values for the phase interpolator (e.g., defining a delay between the strobe and the data sampling clock) and vref. Following this analysis, or comparison process, in one example, a Center. Quiet state can be entered when the pattern generation and comparison process is all complete. Following the centering of the lanes through the Center.Pattern and Center Quiet link states (and any other example link training states), a sideband handshake (e.g., using an LSM sideband signal over the dedicated LSM sideband lane of the link) can be facilitated to transition to a Link.Init state to initialize the MCPL according to the results of the link training and cause the MCPL to enter an active, L0, or transmitting state. In the active link state, the sending of (substantive) data on the MCPL is enabled.

As noted above, sideband handshakes can be used to facilitate link state machine transitions between dies or chips in a multi-chip package. For instance, signals on the LSM sideband lanes of an MCPL can be used to synchronize the state machine transitions across the die. For example, when the conditions to exit a state (e.g., Reset.Idle) are met, the side that met those conditions can assert, on its outbound LSM_SB lane, an LSM sideband signal and wait for the other remote die to reach the same condition and assert an LSM sideband signal on its LSM_SB lane. When both LSM_SB signals are asserted the link state machine of each respective die can transition to the next state (e.g., a Reset.Cal state). A minimum overlap time can be defined during which both LSM_SB signals should be kept asserted prior to transitioning state. Further, a minimum quiesce time can be defined after LSM_SB is de-asserted to allow for accurate turn-around detection. In some implementations, every link state machine transition can be conditioned on and facilitated by such LSM_SB handshakes.

Figure 11:
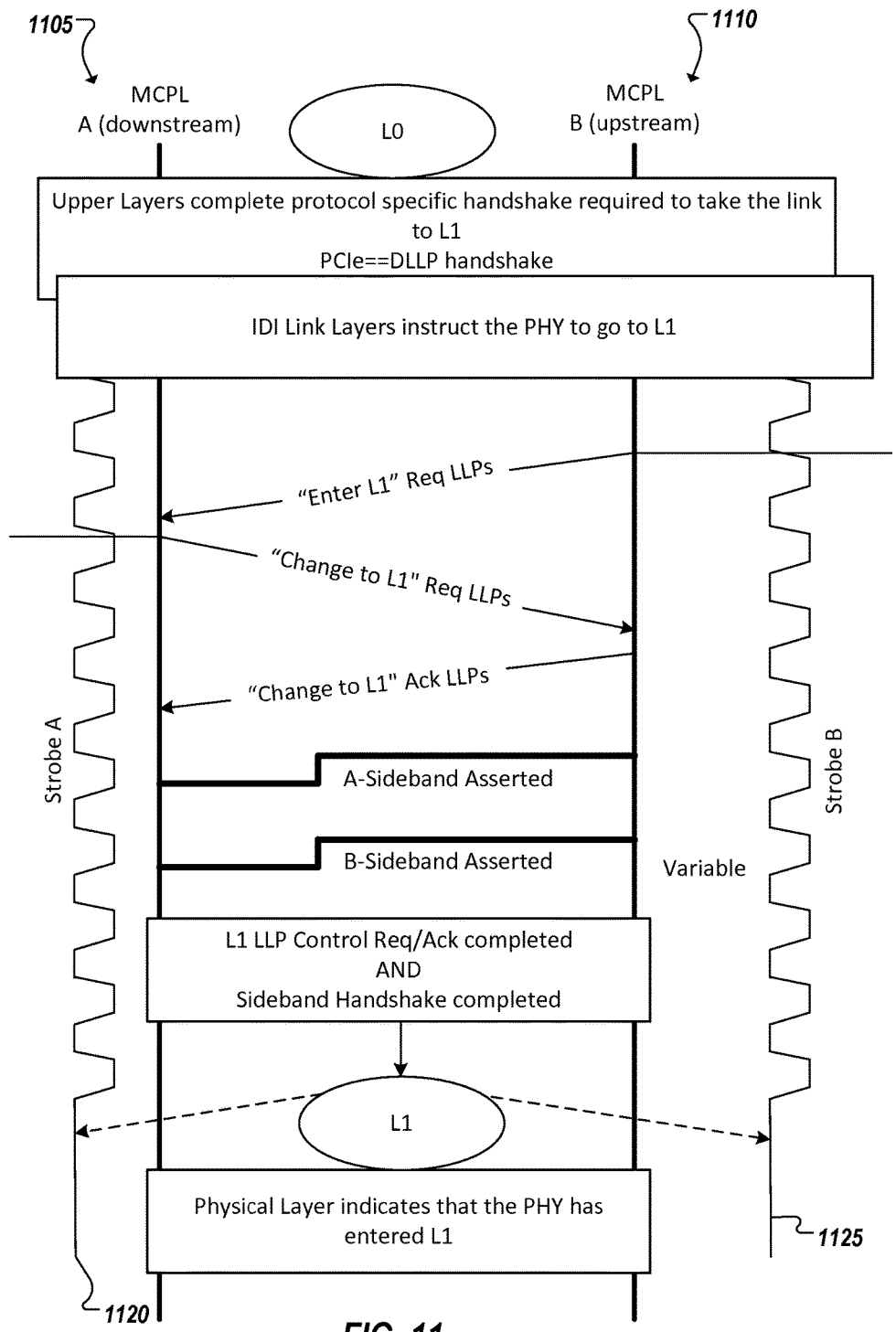
FIG. 11 is a representation of an example link state machine.

FIG. 11 is a more detailed link state machine diagram 1100, illustrating at least some of the additional link states and link state transitions that can be included in an example MCPL. In some implementations, an example link state machine can include, among the other states and state transitions illustrated in FIG. 11, a "Directed Loopback" transition can be provided to place the lanes of an MCPL into a digital loopback. For instance, the receiver lanes of an MCPL can be looped back to the transmitter lanes after the clock recovery circuits. An "LB_Recenter" state can also be provided in some instances, which can be used to align the data symbols. Additionally, as shown in FIG. 11, MCPL can support multiple link states, including an active L0 state and low power states, such as an L1 idle state, and L2 sleep state, among potentially other examples. As another example, configuration or centering states (e.g., CENTER) can be augmented or natively support reconfiguration of a link, while powered on, to allow lanes of the link to be re-assigned to route data around one or more lanes of the link determined to be faulty, or marginal, among other examples.

While the examples above describe, generally, the techniques and example benefits for training at least some of the lanes of an example link, such as an MCPL, the training of some lanes may be problematic. For instance, in the case of an MCPL (or similar interconnects), a valid lane can be difficult to not only train, but to synchronize with the data lanes it effectively controls. For instance, as described above, a valid lane can be used to signal to a receiver that data is expected on the data lanes of an MCPL. This can cause the receiver to provide power, transition from idle, or otherwise prepare receiver circuitry to receive and begin processing the expected data.

In MCPL, a dedicated valid lane is used to enable very fast power state transition. For instance (such as shown and discussed in connection with the example of FIG. 7), the transmitting device (or transmitter) can assert the valid lane (e.g., generating the valid signal) to indicate start of data traffic on the data lanes in a next signaling window (e.g., 8UI later). The receiver can continuously sample the valid lane and detect valid assertions. From the first UI (or signaling window boundary) in which the valid is asserted, the receiver can then count a UI duration (e.g., 8 UI) before sampling the corresponding plurality of data lanes of the MCPL. As a result, it is critical that the rising and falling edges of valid be sampled accurately. For instance, a failure to properly sample the valid lane (and/or the data lanes) can result in errors in the event of a skew between the sampling or clocking of the valid and data lanes, such as data arriving before it is expected, data being cut off before it is finished, transients on data lanes being incorrectly interpreted as data, etc., among other example issues.

Training and centering of the data lanes, while desirable, can make synchronized sampling of the valid and data lanes difficult. To illustrate, turning to FIG. 12, a diagram 1200 is shown representing example signaling on an MCPL. In this example, training patterns 1205, 1210, 1215 are sent on lanes of the MCPL to be trained. The lanes can include the data lanes of the MCPL (e.g., DATA[0], etc.) and potentially, also, one or more control lanes, including the stream lane. In this example, as in the example of FIG. 7, the valid lane is used to indicate to a receiver that data (e.g., 1205, 1210, 1215) is forthcoming on the data lanes. The valid signal (e.g., 1220) is to be sent in the signaling window (beginning at n) preceding the signaling window (beginning at n+1) in which the training data (e.g., 1205) is to be sent. The valid signal is asserted and held for a duration (e.g., number of UIs or signaling windows) corresponding to the direction of the data to be sent, in this case two signaling windows or 16UI. In this example, the clock is implemented as a 2UI clock, meaning that a UI is clocked at both the rising edge and falling edge of the clock (or strobe) cycle. Further, training patterns, or data, in this example can be sent in a Center-.Pattern state, among other states.

Figure 12:
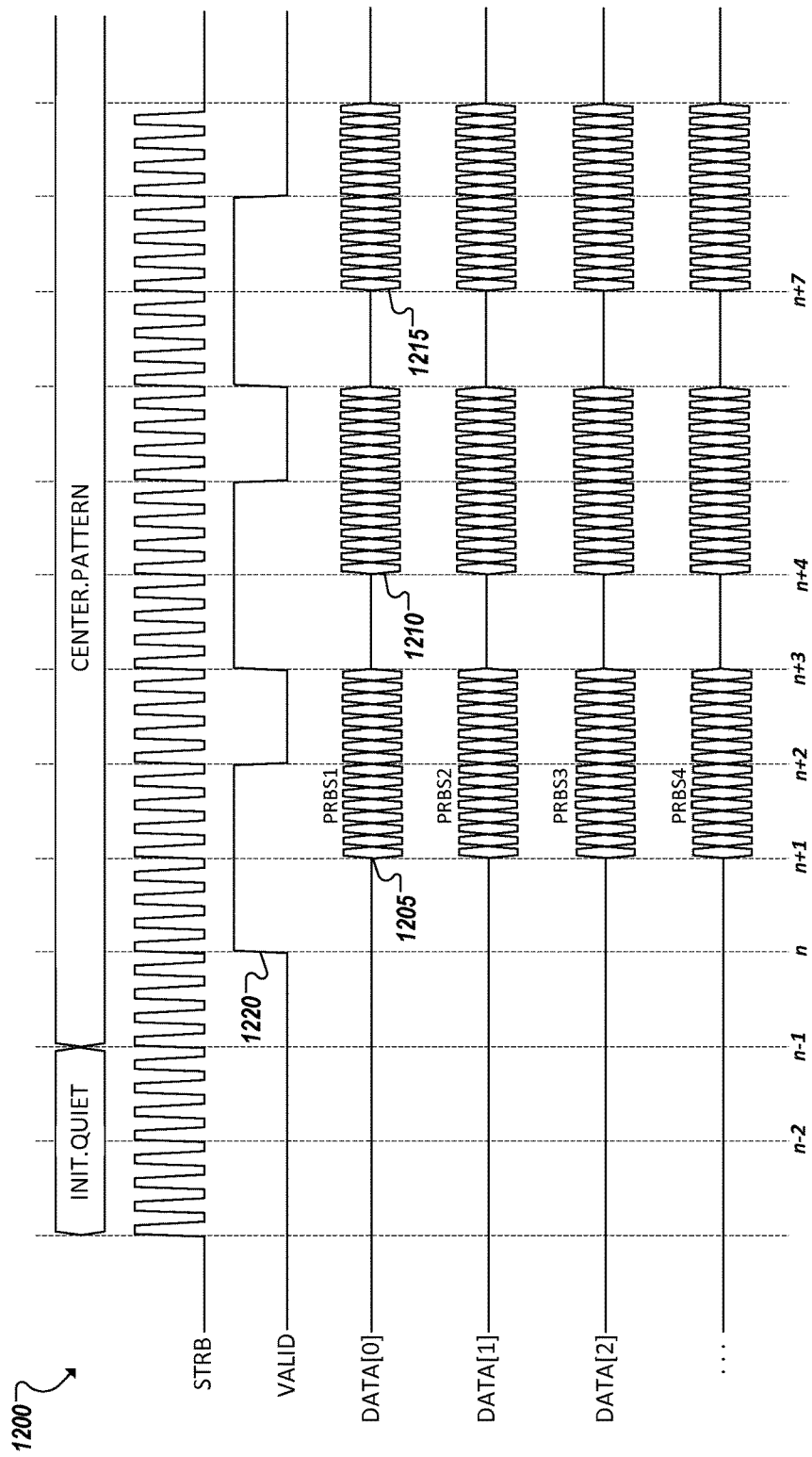
FIG. 12 is a representation of example signaling on an example MCPL.

While the valid lane proves useful in the example of FIG. 12, by supporting fast signaling transitions, using valid (and providing dedicated valid Tx and Rx logic) to support the training of the data lanes by indicating oncoming training patterns, makes it difficult for the valid lane, itself to be trained. This can also complicate synchronizing sampling of the valid and data lanes. Indeed, in instances where the valid lane is an active participant in the training of the data lanes (as in the example of FIG. 12), the valid lane cannot be trained itself. However, failing to train and center the link can result in a skew between the sampling of the valid and data lanes, as the data lanes, by virtue of centering, For instance, as noted above, training of data lanes can involve centering (i.e., interpolating) the sampling clock at a sub-optimal setting for the valid lane.

To synchronize, or make consistent, the sampling of the data lanes with the valid lane (on which timing of the data lanes can depend), some implementations may provide solutions such as using a complement clock tree of the DLL clock (corresponding to the strobe) to sample control lanes like valid. However, utilizing such a complement clock tree can be expensive from a system power perspective and may not be feasible in all systems. In other implementations, a multi-phase link training protocol can be defined, with the control lanes (e.g., valid) and data lanes being trained in two separate processes (i.e., where the control lanes synchronize the data lanes for training and vice versa). However, two-phase training can increase the training time and increase complexity of the system and circuitry design to support the multiple phases of the link training, among other example deficiencies.

Figure 13:
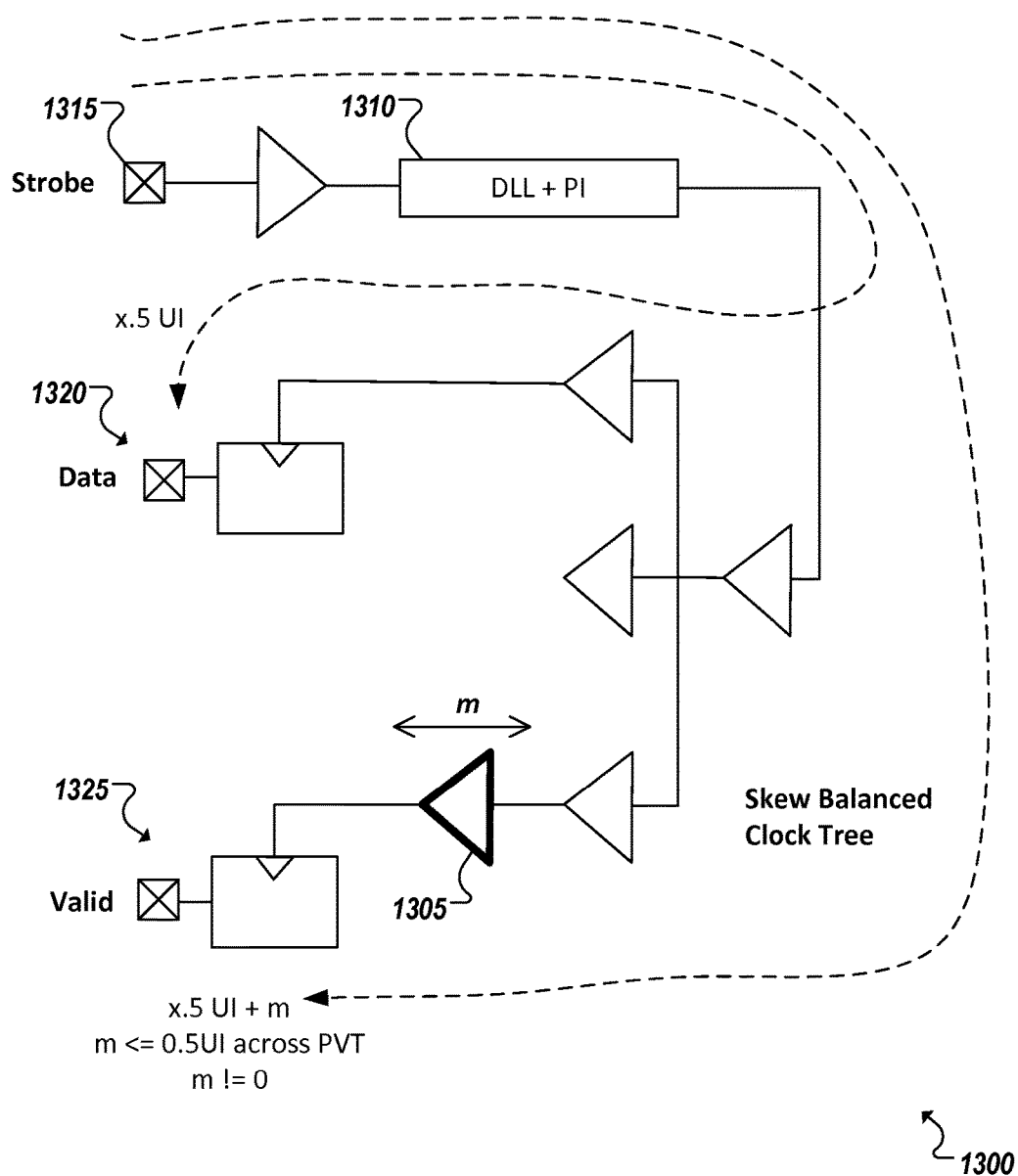
FIG. 13 is block diagram of an example skew balanced clock tree.

As noted above, synchronizing sampling of the valid lane and data lanes can be critical to the successful operation of the MCPL. In one example, training of the valid lane can be kept simple (while supporting more complex training of the data lanes (such as illustrated in the example of FIG. 12)), by providing a skew balanced clock tree to provide the sample clock for sampling both the data lanes and valid lanes. FIG. 13 is a simplified block diagram 1300 illustrating an example implementation utilizing a skew balanced clock tree design. Such a clocking scheme can be used, for instance, where it remains desirable to utilize a valid lane in its typical context to assist in training the data lanes by controlling (or indicating) the upcoming sending of training patterns on the data lanes. However, in such instances, the valid lane is not included in the centering process that defines the optimal sampling point (e.g., at the receiver) for sampling the data lanes. This results, as well, in a circular problem, as the sampling of the valid is not necessarily synchronized with the sampling of the data lanes during the training of the data lanes (e.g., shown in FIG. 12) to allow accurate bit-by-bit comparison of received training patterns at the receiver during training, among other example issues.

To address this, a skew balanced clock tree, such as shown in FIG. 13, can be provided. Since data is to be sampled at a precise UI or signaling window boundary corresponding to the start of a valid signal (e.g., 8 UI), to ensure that the sampling clock skews for valid and data lanes are matched, the skew balanced clock tree can provide delay circuitry 1305 that provides a sampling clock skew that guarantees that sampling of the valid lane is within range of the sampling of the data lanes. In the example of FIG. 13, a phase interpolator shifts the DLL clock (1310) of strobe 1315, providing an interpolated version of the strobe signal to the data lane clock domain (e.g., at 1320). Indeed, the interpolated sampling clock of the data lanes 1320 is optimized to center sampling of the data lane in the center of the "eye" of the signal, such that the sampling occurs near the middle of the UI (or at the x.5 UI interval (where x is an integer from 0 to ∞)). The same strobe signal can be provided to the valid lane clock domain 1325 via a clock tree.

Delay circuitry 1305 can cause the clock tree to be skew balanced by implementing delay m that for any anticipated process, voltage, or temperature will remain greater than zero but equal to or less than 0.5UI during operation (i.e., m<=0.5UI). This condition can ensure that sufficient sampling margin exists relative to the skew on the data lanes resulting from training of the data lanes (e.g., 1320). In one example, delay circuitry 1305 can be implemented as a chain of inverter elements, the number of inverter elements corresponding to the desired delay value m. In another implementation, a network of inverter (or other elements) can be provided that is configurable to selectively enable/disabled that combination of elements in the delay circuitry 1305 to provide the desired delay value m. This can allow the delay value to be dynamically determined or even modified. Regardless of the implementation, the delay circuitry 1305 can provide a phase shift of the sampling clock for the valid lane, leading to a skew x.5UI+m. This delay can ensure that sampling of the data lanes and valid lanes remains substantially synchronized to guarantee that valid signals accurately indicate the arrival of data on the data lanes.

In another example implementation, the link training procedures applied to data lanes (such as in the example of FIG. 12) can also be applied to the valid lane in a single phase, or stage, such that the valid lane is centered (and otherwise trained) together with the data lanes. This can ensure that sampling of the valid and data lanes is consistent, as well as allow higher-touch link training techniques (and corresponding benefits) to be enjoyed at the valid lane. In such implementations, the valid lane (and supporting Rx and Tx circuitry at the two devices to be connected by the corresponding MCPL) can operate in two modes. In a first mode, or training mode, the valid lane can operate as any other lane and does not send valid signals to queue the arrival of data on corresponding data lanes (e.g., as in the example of FIG. 12). Likewise, data lanes (and supporting Rx and Tx logic), in this implementation, can be configured to support training and the sending/receiving of corresponding training patterns on the data lanes without the prompting and assistance of a valid lane. In a second, or active, mode, following successful training of the link, the valid lane can operate as control lane as described above, with valid signals being asserted to indicate future arrival of data on corresponding data lanes. Accordingly, devices can send/receive data on both valid lanes and data lanes differently during link training, than when in active states. Indeed, in one implementation, during link training, effectively no distinction may exist between the role of the valid lane and the data lanes during link training.

Figure 14:
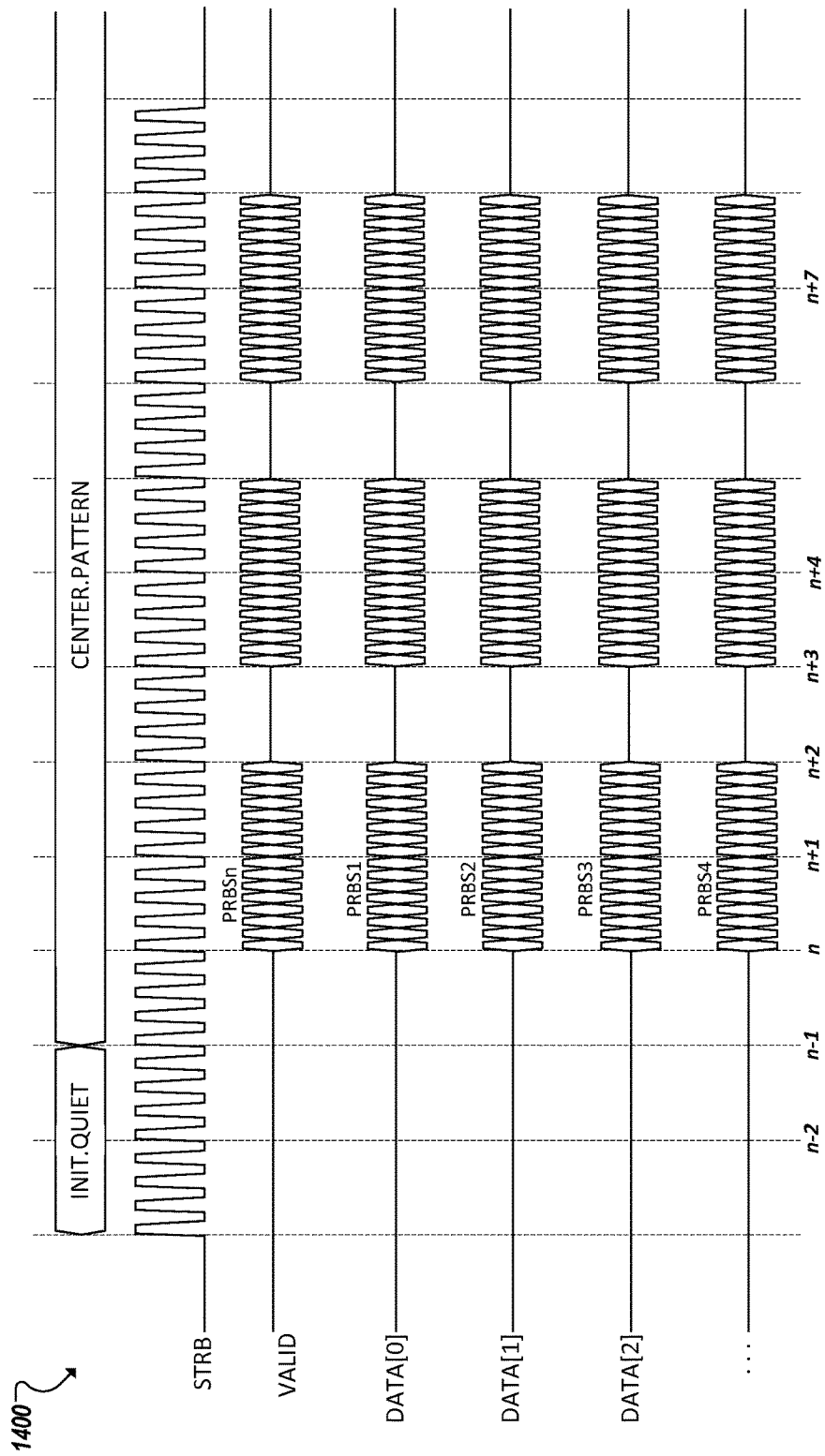
FIG. 14 is a representation of example signaling on an example MCPL during link training, in accordance with one embodiment.

FIG. 14 shows a diagram 1400 representing example signaling on an MCPL during an improved link training mode. The example of FIG. 14 can represent a single phase centering of both the valid lane and data lanes. In one example, as will be discussed in more detail below, the single phase centering can involve training patterns generated using a self-seeded Fibonacci linear feedback shift registers (LFSRs), which generates a pseudorandom binary sequence (PRBS) to synchronize a transmitting device with a remote receiving device over the MCPL. Such a solution can be achieved without a complemented clock tree for control signals and can allow for centering of data and control lanes to be done in a single phase, such that centering of the data lanes and valid lanes (and potentially other control lanes, such as the stream lane) are completed at the same time and together so that environmental factors (e.g., crosstalk) and other factors are better accounted for.

For instance, as shown in FIG. 14, an alternative implementation of the link training shown in example in FIG. 12 is presented. Rather than the valid lane providing valid signals to indicate the arrival of training patterns (e.g., 1205, 1210, 1215) on the data lanes (e.g., DATA[0]), the valid lane is included in the training and is treated as one of the data lanes, with corresponding training patterns (e.g., 1405, 1410, 1415) being sent on the valid lane. Indeed, the valid lane and the set of data lanes (and potentially other lanes, such as a stream lane) are trained concurrently together in a single training process. In this example, the training patterns (e.g., 1205, 1210, 1215, 1405, 1410, 1415) can be sent to center and synchronize the set of lanes. For instance, the training patterns can be sent in a Center.Pattern (or other) link training state. Centering can be used to determine an optimal interpolation phase and comparison voltage to be applied to the sampling of the collection of lanes (valid and data lanes). Arriving at the optimal setting can involve the transmitter sending training patterns (e.g., 1205, 1210, 1215, 1405, 1410, 1415) on the lanes, which are each checked, bit by bit, by the remote receiver. In one example, the centering training patterns can be versions of a PRBS. Training patterns are sent and assessed at each of a (large) set of potential receiver phase interpolation and voltage settings (PI, vref) to determine which combination yields the best results. These settings are then adopted for use in sampling the collection of lanes when the MCPL transitions to an active state (and the valid lanes transitions to its operational mode (e.g., as illustrated in the example of FIG. 7)).

Figure 15:
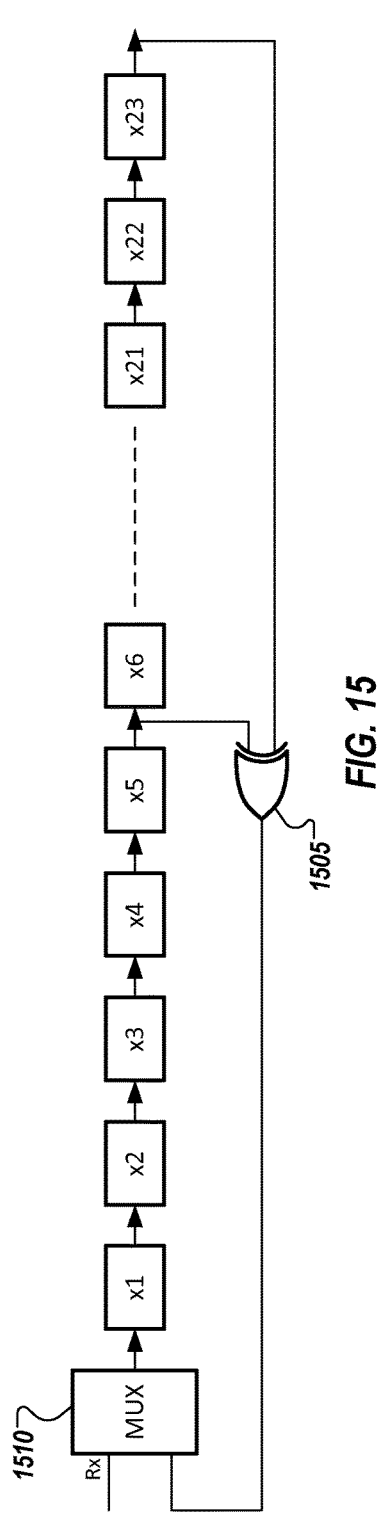
FIG. 15 is block diagram of an example linear feedback shift register (LFSR).

As noted above, training patterns used in training of lanes of an MCPL (including the valid lane) can include or be based on instances of a PRBS. In some implementations, an LFSR, such as a 23-bit Fibonacci LFSR (as shown in FIG. 15) can be used to generate PRBSes for the training of a collection of MCPL lanes. In the example of FIG. 15, the LFSR can be implemented as a chain of flip-flops (e.g., x1-x23) connected as a linear shift register with an XOR gate 1505 providing feedback to the shift register through a multiplexer (mux) 1510.

In some implementations, prior to centering (or other link training activities involving PRBS-based training patterns), all of the LFSRs used to generate the PRBSes for training can be initially seeded with all 0's at the transmitter so that valid and data are sustained low in the lead up to the training patterns (as shown in the example signaling diagram 1600 of FIG. 16). At the receiver, the LFSR mux control 1510 clocks incoming transmitter values into LFSR bit 1. With the transmitter LFSR initially seeded with all 1's (e.g., 23 consecutive bits for the 23 serial flipflops), centering can begin. The receiver can anticipate that a series (e.g., 23 bits, or UI) of 1's will be sent on at least one designated lane (e.g., valid) prior to the training patterns beginning on the valid lane and data lanes (for use in centering these lanes). This series of 1's can follow a preceding series of 0's on at least the designated lane. In some implementations, such as shown in FIG. 16, the series of 0's and series of 1's can precede the training patterns on both the valid lane and each of the corresponding data lanes to signal the beginning of training. The receiver can further used the incoming stream of 1's to self-seed its own LFSR in anticipation of the upcoming PRBSes to be sent on the lanes to be trained. After the initial seeding of 23 bits of 1's, the mux controller of the LFSR can begin feeding the XOR 1505 output into bit 1 of the LFSR such that the LFSR is self-sustained, and is able to match (at Rx) the PRBSes generated by the LFSR of the transmitter.

Figure 17:
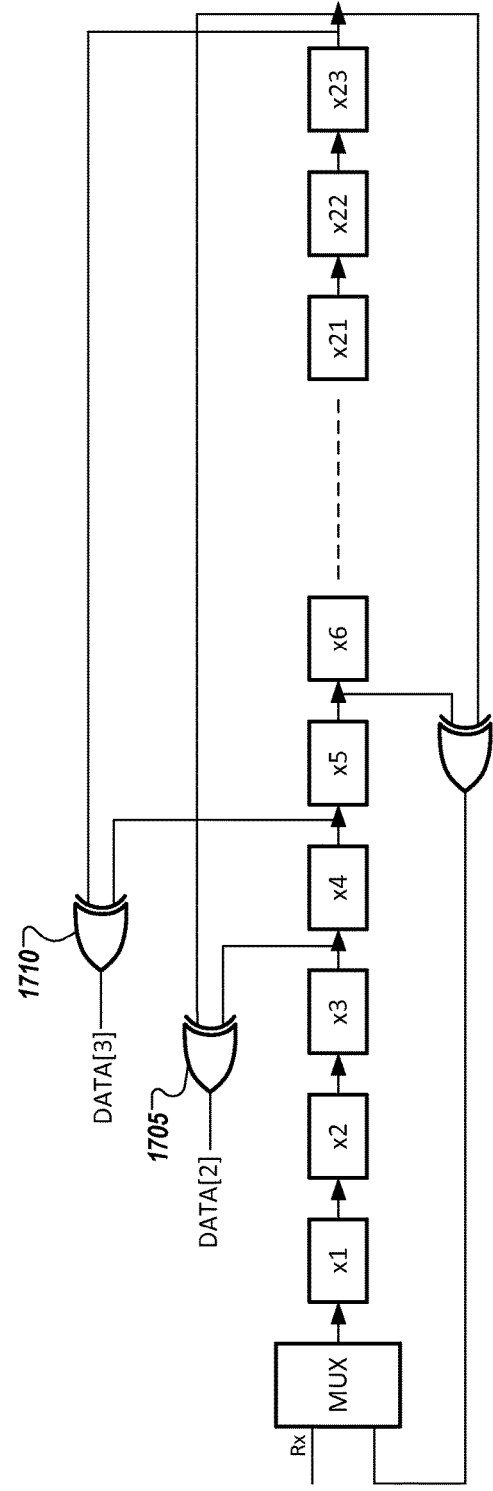
FIG. 17 is block diagram of another example linear feedback shift register (LFSR).

In some implementations, a single LFSR (such as illustrated in FIG. 15) can be used to generate a plurality of non-correlated PRBSes, one for each lane to be trained. For instance, Table 1, below, illustrates that, for a 1UI clock, different combinations of two LFSR bits can each be XORed to generate the non-correlated set of PRBSes for the training of a set of 20 data lanes, a stream lane (S), and a valid lane (V) from a single LSFR. FIG. 17 is a diagram illustrating a portion of the XOR network that can be connected to the LFSR to generate lane specific non-correlated PRBSes. For instance, FIG. 17 shows XOR gates 1705, 1710 used to generate two non-correlated PRBSes for data lanes DATA [2] and DATA[3], according to the implementation described in Table 1. It should be appreciated that a full implementation of Table 1 would include 20 additional XOR branches to generate respective PRBSes for the remaining 20 lanes in the example of Table 1.

Where the operator "^" indicates an exclusive OR (XOR) operation upon bit outputs at corresponding flipflops of the LFSR. This set of 8 PRBS bits can then be provided to a SERDES to be serialized over 8 UIs of the MCPL (e.g., for use in training the valid and other lanes in a set of lanes).

A self-sustained LFSR of a receiver can be synchronized to the LFSR of a remote transmitter and can be used for measuring bit error rate (BER) on the PRBS on all the lanes including the valid lane (e.g., during link training). This approach works even when each lane has a different (non-correlated) PRBS derived by a linear combination of LFSR bits as shown and described in some of the example above. Each of the receiver and transmitter LFSRs can be self-seeded after the initialization (e.g., all 1's over 23 UI), such that both LFSRs are generating the same sequences for each of the lanes. The receiver can thus check, bit by bit, on each lane, whether the received PRBS (following the self-seeding period) matches what is expected to determine the BER for each lane. Other training activities can similarly take advantage of the synchronization between the receiver and transmitter LFSRs, including during centering.

Figure 19:
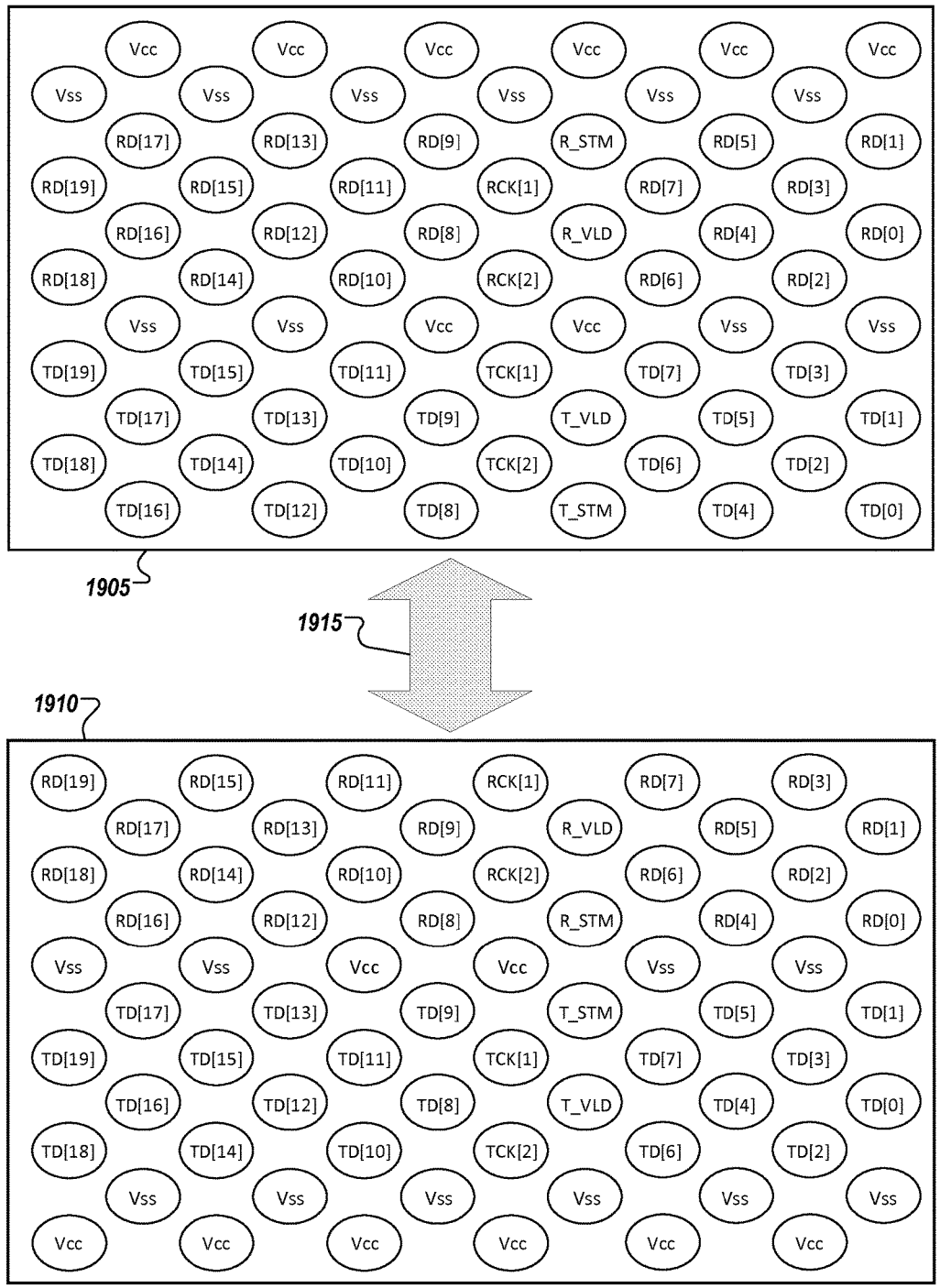
FIG. 19 is block diagram illustrating bumpout layout of two devices interconnected by an example MCPL.

FIG. 19 is a block diagram 1900 illustrating simplified bumpouts of each of two devices 1905, 1910 connected by a multi-lane MCPL. For instance, each device 1905, 1910 can include bumps to transmit on multiple (e.g., 20) data lanes (e.g., TD[0-19]) and bumps to receive on multiple (e.g., 20) data lanes (e.g., RD[0-19]). Likewise, each device 1905, 1910 can include bumps for the corresponding transmit and receive stream lanes (e.g., T_STM, R_STM) and transmit and receive valid lanes (e.g., T_VLD, R_VLD) of the MCPL 1915. Additional bumps can be provided for

TABLE 1

| | Non-Correlated PRBS | | | | | | | | | | | | | | | | | | | | |
|---|---|---|---|---|---|---|---|---|---|---|---|---|---|---|---|---|---|---|---|---|---|
| Lane | 0 | 1 | 2 | 3 | 4 | 5 | 6 | 7 | S | V | 8 | 9 | 10 | 11 | 12 | 13 | 14 | 15 | 16 | 17 | 18 | 19 |
| Bit x | 23 | 23 | 23 | 23 | 23 | 23 | 23 | 23 | 23 | 23 | 23 | 23 | 23 | 23 | 23 | 23 | 23 | 23 | 23 | 23 | 23 | 23 |
| Bit y | 1 | 2 | 3 | 4 | 5 | 6 | 7 | 8 | 9 | 10 | 11 | 12 | 13 | 14 | 15 | 16 | 17 | 18 | 19 | 20 | 21 | 22 |

Figure 18:
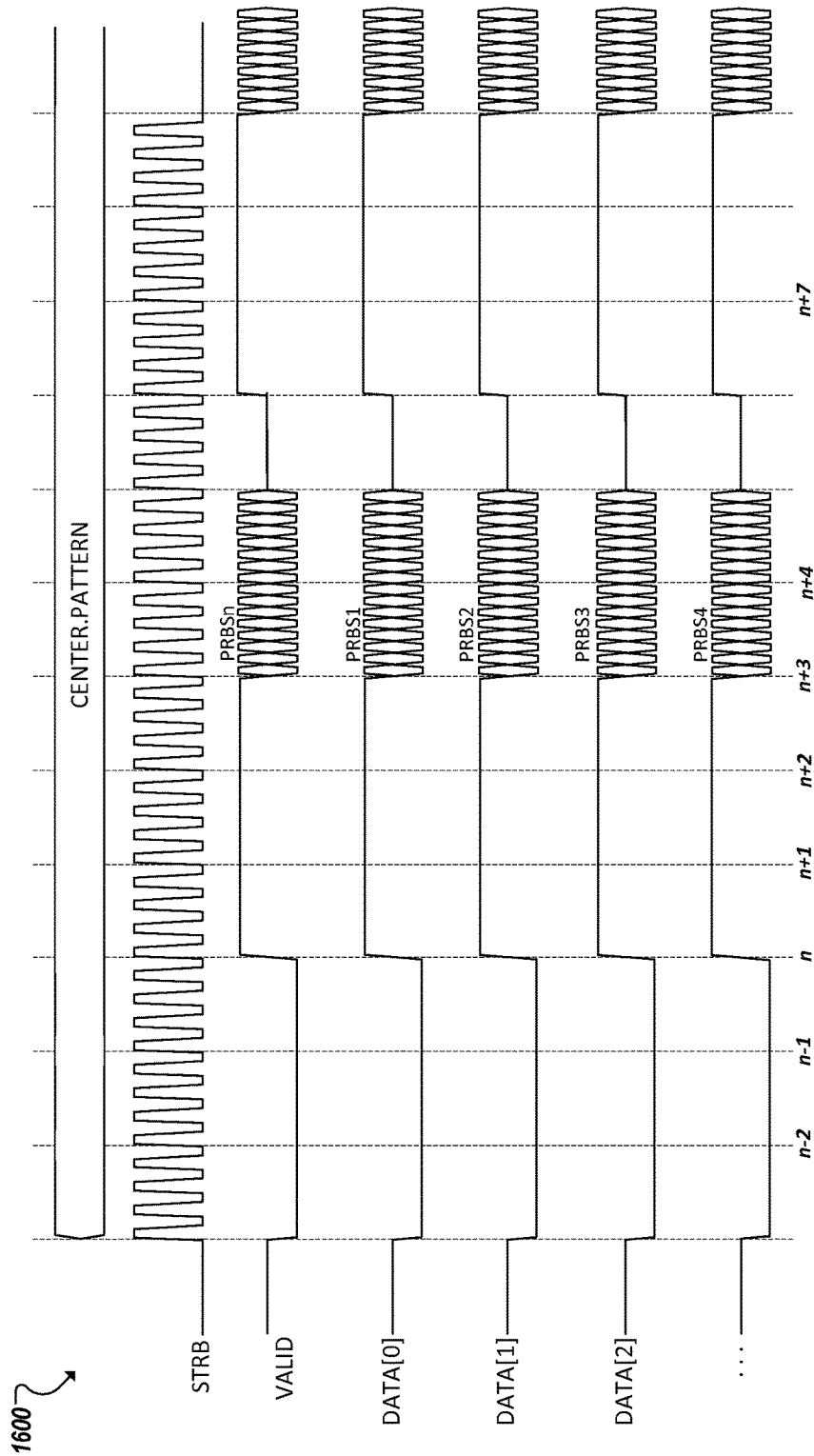
FIG. 18 is a table illustrating an example implementation of a non-correlated pseudo random binary sequence generated from an example LFSR.

While Table 1 (and FIG. 17) describe an implementation of generated a set of non-correlated PRBS streams for a collection of lanes according to a 1UI clock (e.g., 1 UI per clock cycle), other implementations may use involve multiple UI clocks, such as a 2 UI clock. Accordingly, two consecutive bits in a lane's PRBS can be generated per clock cycle. The multiple bits can be provided to a serializer/deserializer (SERDES) which provides the bits as a portion of a serial PRBS stream on the corresponding lane. In other implementations, an 8UI clock can be used (enabling high data rates with potentially constrained clock speeds). For instance, FIG. 18 illustrates a table (analogous to and extending the example of Table 1 and FIG. 17) showing how 8 instances of non-correlated PRBS can be generated per cycle from XOR various combinations of a single LFSR's bit outputs. For instance, for the valid lane V, eight different PRBS bits (1-8) can be generated (e.g., one for each UI of clock cycle) of the LFSR according to:

(1) x23^x10
(2) x22^x9
(3) x21^x8
(4) x20^x7
(5) x19^x6
(6) x18^x5
(7) x17^x4
(8) x16^x3 power (e.g., Vcc, Vss) and clocking (e.g., RCK, TCK), among other examples. The bumps represent physical points of connection of the respective devices to corresponding lanes of the MCPL 1915 to the respective device 1905, 1910. As illustrated, some bumpouts (and corresponding lanes) are closer in proximity than others. Lanes and bumps in close proximity are more likely to introduce crosstalk on each other than lanes/bumps that are further removed. The physical layout of bumpouts and lanes can serve as the basis of developing additional link training tests and activities, such as crosstalk testing.

FIG. 20 illustrates a table 2000 illustrating for each loop, or phase, of a crosstalk test to be performed on a set of lanes in an MCPL. Different test patterns (e.g., PRBS instances) can be sent on the lanes to test crosstalk. In this example, each loop involves testing two of the lanes for crosstalk stress. At each successive loop, a different pair of lanes are tested. The lanes under test can be far enough apart that they are substantially immune from crosstalk from the other lane under test. For instance, in loop 0, lanes DATA[0] and DATA[9] are tested as "victims" with lanes DATA[1-3] and DATA[17-19] acting as aggressors of lane DATA[0] and lanes DATA[8, 10-12] and the stream lane (S) acting as aggressors of lane DATA[9]. A "victim" signal (L) is sent on the victim lanes under test and aggressor signals (H) are sent on the respective, neighboring aggressor lanes to provide crosstalk stress to the victim lane. In some implementations, these aggressor signals (H) can be the complement of the victim signal (L). For instance, in one example, L can be a PRBS pattern while H is the inverted PRBS pattern. During a given test, or loop, lanes further removed from the victim lane can carry other signals (e.g., signals "1"-"22") that are different than both the victim (L) and aggressor signals (H) (e.g., non-correlated instances of a PRBS).

Figure 21:
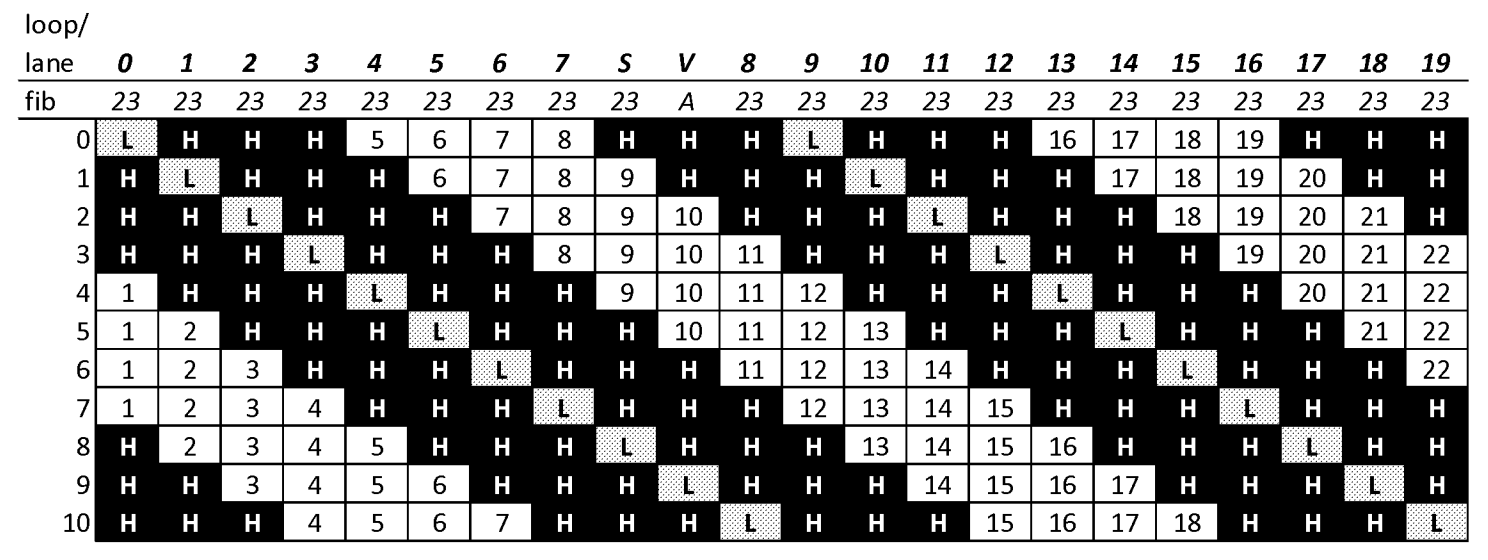

The example of FIG. 20 illustrates a crosstalk stress test where the valid lane is not trained together with the other lanes, such as in the example of FIG. 12. To support the training, the valid lane, in this example, is asserted (shown as value "A" in the table of FIG. 20) to indicate the arrival of the various (and substantially continuous) crosstalk stress test patterns on the data lanes. However, failing to account for the valid lane and its position within the bumpout and link can result in suboptimal crosstalk analysis not only for those lanes that neighbor the valid lane (e.g., the stream lane and data lane DATA[8]), but for the valid lane itself. Accordingly, as shown in FIG. 21, in instances where the valid lane (V) is trained together with the data lanes, crosstalk stress test signals (including victim and aggressor signals) can be sent on the valid lane as any other data lane. For instance, in loop (or test) number 9 of the example shown in FIG. 21, the valid lane is tested by sending a victim signal L on the lane and aggressor signals on those lanes in closest proximity to the valid lane. In this case the valid lane PRBS is preceded by the string of 1's to facilitate self-seeding as described previously. Such string of prior 1's can be sent for each loop irrespective of signals L, H or another signal being sent on the designated lane (e.g., for signal H, the LFSR can be self-seed with the inverted shift register value and the PRBS can be generated by inverting the outputs (e.g DATA(n)) of the implementation show in FIG. 17).

In some cases, the victim and aggressor signals can include or be based on a PRBS, as with other training patterns used to train the valid lane together with other lanes of an MCPL. For instance, the signals provided in the table 2100 illustrated in FIG. 21 can be generated by a self-seeded LFSR, such as described above. Indeed, as in the centering example above (and as illustrated, for instance, in FIG. 16), generation of PRBSes for crosstalk test signals, an LFSR seeding phase to synchronize the transmitter and receivers, followed by the generation of the PRBSes on the various lanes. In some cases, the link can be subdivided into two clusters of lanes (e.g. in cases where there are multiple valid lanes and each cluster has at least one valid lane). In such cases, there may be multiple designated lanes but the self-seeding for each cluster happens after the all stream of 1's (e.g., as described in previous paragraph) and the PRBS-generating phase is common so that crosstalk can span the clusters.

It should be appreciated that the specific examples illustrated above are provided as non-limiting examples of the application of the more general principles described herein. For instance, other systems, link protocols, and technologies can also incorporate and make use of the above features. Some alternative implementations can adopt characteristics different from the specific examples illustrated above without departing from the scope of the present disclosure. For instance, links can be provided with varying numbers of lanes, different lane/bump layouts, different clocking speeds and data rates, training patterns, link state machines, and link protocols, while still implementing and enjoying the benefits of the various features and principles described herein, among other examples.

Figure 22:
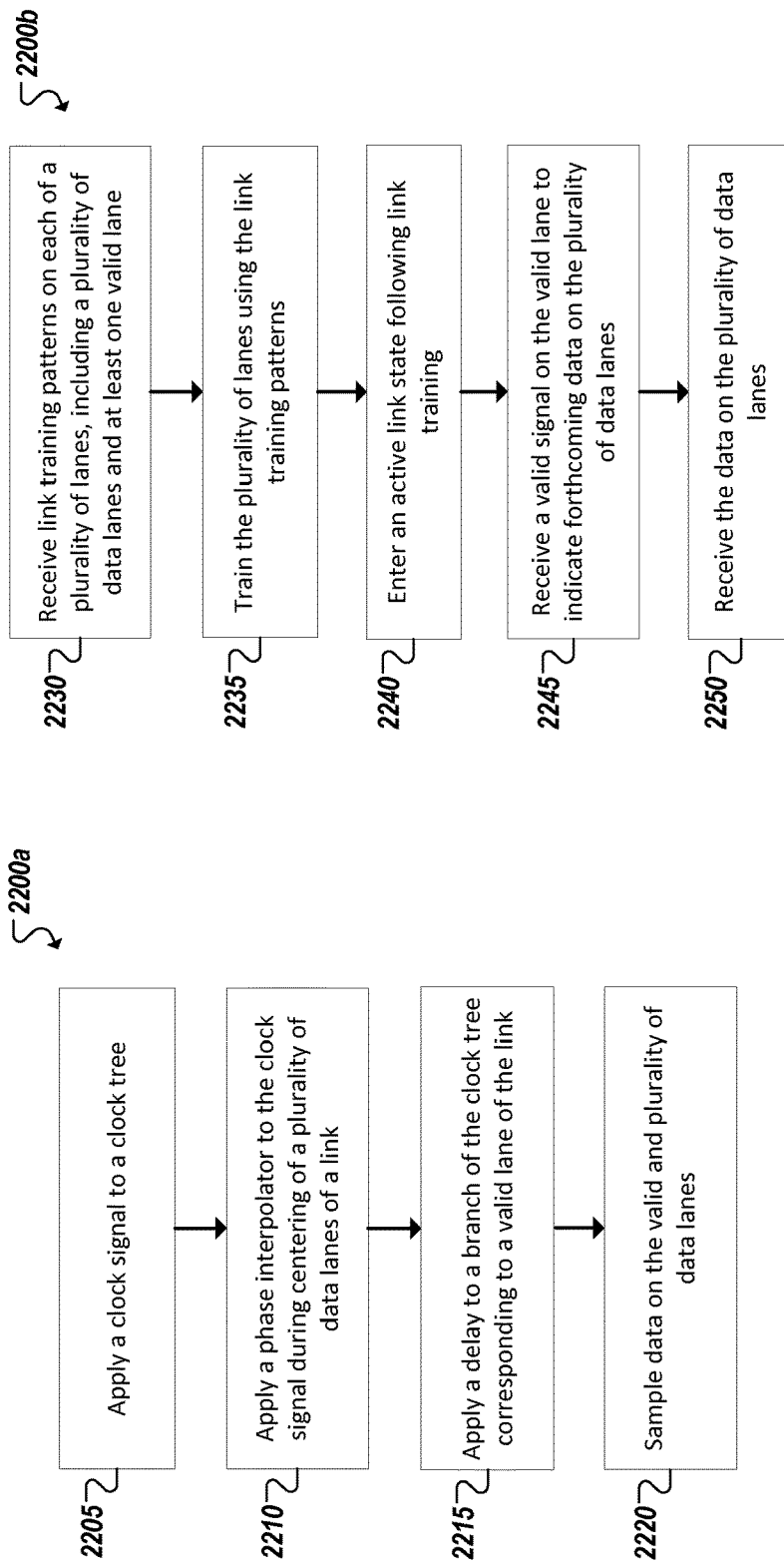
FIGS. 22A-22B are simplified flowcharts illustrating techniques for training a valid lane of an MCPL.

FIGS. 22A-22B show flowcharts 2200a-b illustrating example techniques for training a valid lane of a multi-protocol, time-multiplexed interconnect link. For instance, in FIG. 22A, a skew balanced clock tree can be utilized to synchronize sampling of data lanes of the link with the valid lane, as the sending of data on the data lanes is to be timed based on the start of valid signals sent on the valid lane. For instance, a strobe, or clock signal can be provided 2205 on the clock tree and a phase interpolator can be applied 2210 to the clock signal during centering of the data lanes. The phase interpolator can define a skew of the sampling clock used to sample the data lanes. A delay can be applied 2215 to a branch of the clock tree corresponding to the valid lane to substantially synchronize sampling 2220 of the valid lane with sampling of the data lanes. The delay can be defined, in hardware-based delay circuitry, such that the applied delay, m, for any anticipated process, voltage, or temperature, will remain greater than zero but equal to or less than 0.5UI during operation (i.e., 0<m<=0.5UI).

Turning to FIG. 22B, in an alternative embodiment, the valid lane can be trained together with data lanes of the link in a single phase or training session. For instance, link training patterns can be received 2230 (e.g., at a receiving device from a transmitting device connected by the link) on each of a set of lanes of the link, the set including the plurality of data lanes and the valid lane. The set of lanes can be trained 2235 together based on the training patterns. Training can include centering of the set of lanes and crosstalk analysis, among other activities. Training can determine operating characteristics to be applied to the link during an active, L0, or transmitting link state. Accordingly, the active link state can be entered 2240 following completion of the link training and the valid lane can resume normal, or active, operation, in which a valid signal is sent (and received 2245) on the valid lane to indicate upcoming data to be sent (e.g., in an immediately subsequent signaling window) on the data lanes. This can cause the data lanes (and supporting circuitry at the receiver) to be readied for the arrival 2250 of the data. The concurrent training 2235 of the valid lane and plurality of data lanes can allow sampling of each to be synchronized, enabling the receiver to rely on the valid signal to reliably indicate the precise time (e.g., UI) at which the corresponding data will begin to arrive on the data lanes.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 23:
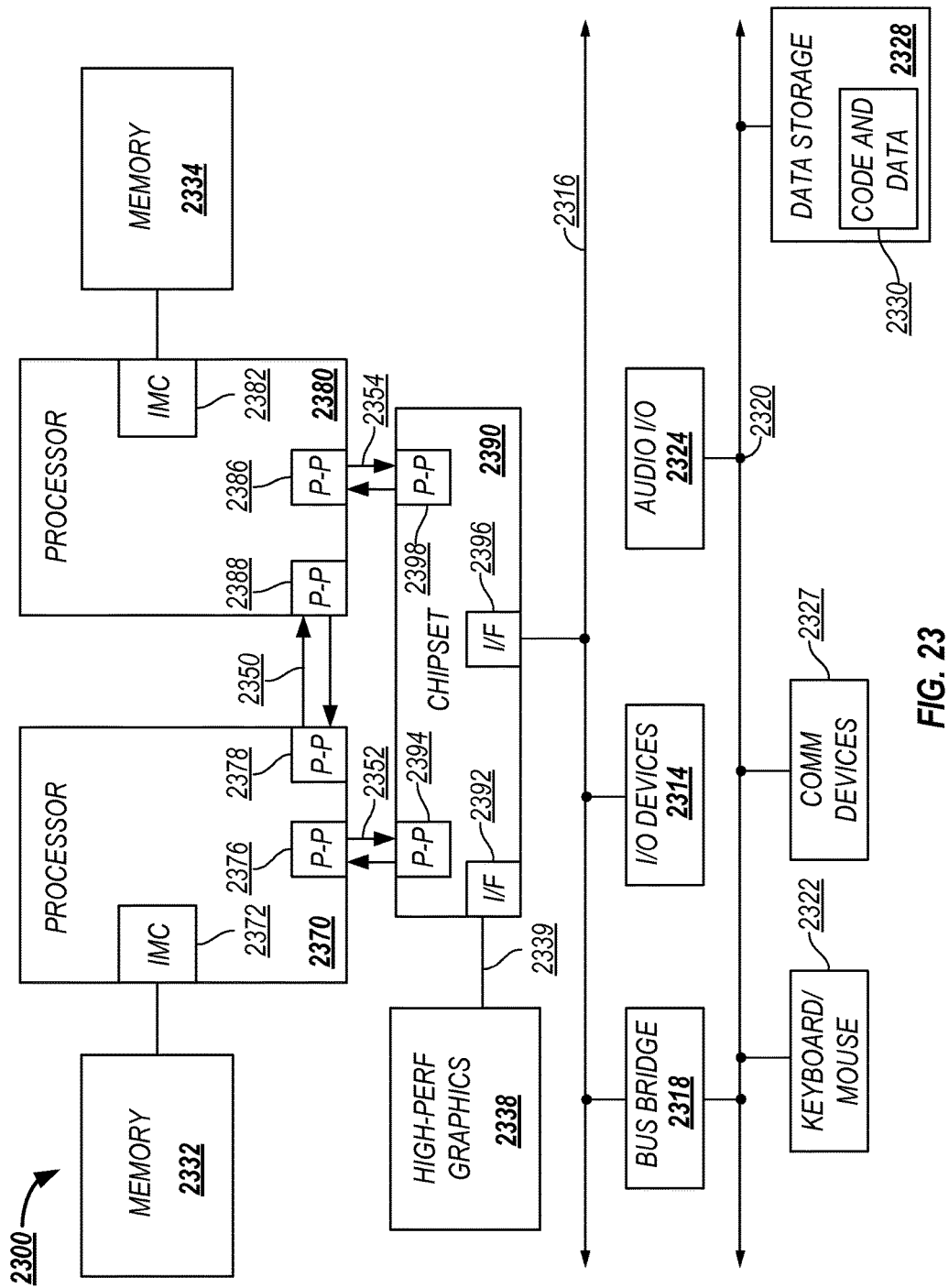
FIG. 23 illustrates an embodiment of a block for a computing system including multiple processors.

Referring now to FIG. 23, an example implementation of a system 2300 is shown in accordance with an example embodiment. As shown in FIG. 23, multiprocessor system 2300 is a point-to-point interconnect system, and includes a first processor 2370 and a second processor 2380 coupled via a point-to-point interconnect 2350. Each of processors 2370 and 2380 may be some version of a processor. In one embodiment, 2352 and 2354 are part of a serial, point-to-point coherent interconnect fabric, such as a high-performance architecture. As a result, the invention may be implemented within the QPI architecture.

While shown with only two processors 2370, 2380, it is to be understood that the scope of the present invention is not so limited. In other embodiments, one or more additional processors may be present in a given processor.

Processors 2370 and 2380 are shown including integrated memory controller units 2372 and 2382, respectively. Processor 2370 also includes as part of its bus controller units point-to-point (P-P) interfaces 2376 and 2378; similarly, second processor 2380 includes P-P interfaces 2386 and 2388. Processors 2370, 2380 may exchange information via a point-to-point (P-P) interface 2350 using P-P interface circuits 2378, 2388. As shown in FIG. 23, IMCs 2372 and 2382 couple the processors to respective memories, namely a memory 2332 and a memory 2334, which may be portions of main memory locally attached to the respective processors.

Processors 2370, 2380 each exchange information with a chipset 2390 via individual P-P interfaces 2352, 2354 using point to point interface circuits 2376, 2394, 2386, 2398. Chipset 2390 also exchanges information with a high-performance graphics circuit 2338 via an interface circuit 2392 along a high-performance graphics interconnect 2339.

A shared cache (not shown) may be included in either processor or outside of both processors; yet connected with the processors via P-P interconnect, such that either or both processors' local cache information may be stored in the shared cache if a processor is placed into a low power mode.

Chipset 2390 may be coupled to a first bus 2316 via an interface 2396. In one embodiment, first bus 2316 may be a Peripheral Component Interconnect (PCI) bus, or a bus such as a PCI Express bus or another third generation I/O interconnect bus, although the scope of the present invention is not so limited.

As shown in FIG. 23, various I/O devices 2314 are coupled to first bus 2316, along with a bus bridge 2318 which couples first bus 2316 to a second bus 2320. In one embodiment, second bus 2320 includes a low pin count (LPC) bus. Various devices are coupled to second bus 2320 including, for example, a keyboard and/or mouse 2322, communication devices 2327 and a storage unit 2328 such as a disk drive or other mass storage device which often includes instructions/code and data 2330, in one embodiment. Further, an audio I/O 2324 is shown coupled to second bus 2320. Note that other architectures are possible, where the included components and interconnect architectures vary. For example, instead of the point-to-point architecture of FIG. 23, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the micro-controller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and/or method to receive one or more link training signals including instances of a link training pattern on a plurality of lanes of a physical link that includes at least one valid lane and a plurality of data lanes, train the plurality of lanes together using the link training signals to synchronize sampling of the valid lane with sampling of the plurality of data lanes, enter an active link state, receive a valid signal on the valid lane during the active link state, the valid signal including a signal held at a value for a defined first duration and indicating that data is to be received on the plurality of data lanes in a second defined duration subsequent to the first duration. The data is to be received, during the active link state, on the plurality of data lanes during the second defined duration.

In one example, the valid signal is received at a beginning of a first one of a series of signaling windows defined for the link, each of the series of signaling windows include a common defined duration, the first duration includes the duration of the first signaling window, the second duration includes the duration of a second signaling window subsequent to the first signaling window in the series, the data is to be sent over a number of consecutive signaling windows, and the valid signal is held at the value for the number of consecutive signaling windows and is to be de-asserted after the end of the number of consecutive signaling windows to indicate an end to the data being sent on the plurality of data lanes.

In one example, the link supports multiplexing data of a plurality of different protocols on the plurality of data lanes.

In one example, the plurality of lanes further include a stream lane, and a stream identifier signal is to be sent on the stream lane to indicate which of the plurality of protocols applies to data being sent on the plurality of data lanes.

In one example, the instances of the link training pattern include a plurality of instances of a pseudorandom binary sequence (PRBS).

In one example, the plurality of instances of the PRBS include non-correlated instances of the PRBS and a different one of the plurality of instances of the PRBS is to be sent on each lane in the plurality of lanes.

In one example, the plurality of instances of the PRBS are generated from a common linear feedback shift register (LFSR).

In one example, a receiver LFSR is provided that is synchronized with a remote transmitter LFSR.

In one example, training the plurality of lanes includes centering the plurality of lanes.

In one example, training the plurality of lanes includes performing crosstalk stress testing for each of the plurality of lanes.

In one example, detecting a particular signal sent on the valid lane to indicate future receipt of the one or more link training signals.

In one example, the particular signal transitions to a respective one of the link training signals on the valid lane.

In one example, the particular signal is used to self-seed an LFSR used to assess the link training signals.

One or more embodiments may provide an apparatus, a system, a machine readable storage, a machine readable medium, and/or method to send one or more link training signals including instances of a link training pattern on a plurality of lanes of a physical link that includes at least one valid lane and a plurality of data lanes, enter an active link state based on training of the plurality of lanes using the link training signals, and send a valid signal on the valid lane during the active link state, the valid signal including a signal held at a value for a defined first duration and indicating that data is to be sent on the plurality of data lanes in a second defined duration subsequent to the first duration.

The data is to be sent, during the active link state, on the plurality of data lanes during the second defined duration.

In one example, a linear feedback shift register (LFSR) generates the instances of the link training pattern.

In one example, the instances of the link training pattern include a plurality of different link training patterns, and each of the plurality of link training patterns is to be sent on a respective one of the plurality of lanes.

In one example, the plurality of link training patterns include a plurality of instances of a pseudo random binary sequence (PRBS).

In one example, physical layer logic self-seeds the LFSR.

In one example, the LFSR causes a first pattern to be generated on the valid lane to indicate that the link training patterns are to be sent based on the self-seeding.

In one example, the first pattern is used by a remote receiver device to synchronize an LFSR of the receiver device.

In one example, the plurality of lanes further include a stream lane, and physical layer logic identifies a type of the data to be sent on the plurality of data lanes and sends a stream identifier signal on the stream lane to indicate the type of the data.

In one example, each duration includes a respective one of a plurality of signaling windows, and each signaling window has a common duration.

In one example, the common duration includes 8 unit intervals (UI).

One or more embodiments may provide a system including an interconnect including a plurality of lanes, the plurality of lanes including a plurality of dedicated data lanes and at least one dedicated valid signal lane. The system can further include a first device and a second device communicatively coupled to the first device using the interconnect. The second device can send one or more link training signals including instances of a link training pattern to the first device on the plurality of lanes, enter an active link state based on training of the plurality of lanes using the link training signals, and send a valid signal to the first device on the valid lane during the active link state in connection with data sent by the second device to the first device on the data lanes. The valid signal can include a signal held at a value throughout a first signaling window and indicate that data is to be sent on the plurality of data lanes in a second signaling window subsequent to the first signaling window, where the data is sent, during the active link state, to the first device on the plurality of data lanes during the second signaling window.

In one example, the first device can receive the one or more link training signals, participate in the training of the plurality of lanes using the link training signals, enter the active link state, receive the valid signal during the first signaling window, and receive the data on the plurality of data lanes during the second signaling window.

In one example, the first device can determine a phase interpolation to be applied to sampling of the plurality of lanes based on the training signals.

In one example, the plurality of lanes includes at least one stream signal lane to identify which of a plurality of supported protocols is to be applied to data sent during a corresponding signaling window on the plurality of data lanes.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. An apparatus comprising:
    physical layer logic to:
        receive one or more link training signals comprising instances of a link training pattern on a plurality of lanes of a physical link, wherein the plurality of lanes comprise at least one valid lane and a plurality of data lanes;
        train the plurality of lanes using the link training signals to synchronize sampling of the valid lane with sampling of the plurality of data lanes;
        enter an active link state;
        receive a valid signal on the valid lane during the active link state, wherein the valid signal comprises a signal held at a value for a defined first duration and indicates that data is to be received on the plurality of data lanes in a second defined duration subsequent to the first duration; and
        receive the data, during the active link state, on the plurality of data lanes during the second defined duration.

2. The apparatus of claim 1, wherein the valid signal is received at a beginning of a first one of a series of signaling windows defined for the link, each of the series of signaling windows comprise a common defined duration, the first duration comprises the duration of the first signaling window, the second duration comprises the duration of a second signaling window subsequent to the first signaling window in the series, the data is to be sent over a number of consecutive signaling windows, and the valid signal is held at the value for the number of consecutive signaling windows and is to be de-asserted after the end of the number of consecutive signaling windows to indicate an end to the data being sent on the plurality of data lanes.

3. The apparatus of claim 1, wherein the link supports multiplexing data of a plurality of different protocols on the plurality of data lanes.

4. The apparatus of claim 3, wherein the plurality of lanes further comprise a stream lane, and a stream identifier signal is to be sent on the stream lane to indicate which of the plurality of protocols applies to data being sent on the plurality of data lanes.

5. The apparatus of claim 1, wherein the instances of the link training pattern comprise a plurality of instances of a pseudorandom binary sequence (PRBS).

6. The apparatus of claim 5, wherein the plurality of instances of the PRBS comprise non-correlated instances of the PRBS and a different one of the plurality of instances of the PRBS is to be sent on each lane in the plurality of lanes.

7. The apparatus of claim 1, wherein training the plurality of lanes comprises centering the plurality of lanes.

8. The apparatus of claim 1, wherein training the plurality of lanes comprises performing crosstalk stress testing for each of the plurality of lanes.

9. The apparatus of claim 1, wherein the physical layer logic is to detect a particular signal sent on the valid lane to indicate future receipt of the one or more link training signals.

10. The apparatus of claim 9, wherein the particular signal transitions to a respective one of the link training signals on the valid lane.

11. The apparatus of claim 9, wherein the particular signal is used to self-seed a linear-feedback shift register (LFSR) used to assess the link training signals.

12. An apparatus comprising:
physical layer logic to:
send one or more link training signals comprising instances of a link training pattern on a plurality of lanes of a physical link, wherein the plurality of lanes comprise at least one valid lane and a plurality of data lanes;
enter an active link state based on training of the plurality of lanes using the link training signals;
send a valid signal on the valid lane during the active link state, wherein the valid signal comprises a signal held at a value for a defined first duration and indicates that data is to be sent on the plurality of data lanes in a second defined duration subsequent to the first duration; and
send the data, during the active link state, on the plurality of data lanes during the second defined duration.

13. The apparatus of claim 12, further comprising a linear feedback shift register (LFSR) to generate the instances of the link training pattern.

14. The apparatus of claim 13, wherein the instances of the link training pattern comprise a plurality of different link training patterns, and each of the plurality of link training patterns is to be sent on a respective one of the plurality of lanes.

15. The apparatus of claim 13, wherein the plurality of link training patterns comprise a plurality of instances of a pseudo random binary sequence (PRBS).

16. The apparatus of claim 13, wherein physical layer logic is further to self-seed the LFSR, self-seeding the LFSR causes a first pattern to be generated on the valid lane to indicate that the link training patterns are to be sent, and the first pattern is used by a remote receiver device to synchronize an LFSR of the receiver device.

17. The apparatus of claim 12, wherein the plurality of lanes further comprise a stream lane, and the physical layer logic is to:
identify a type of the data to be sent on the plurality of data lanes;
send a stream identifier signal on the stream lane to indicate the type of the data.

18. The apparatus of claim 12, wherein each duration comprises a respective one of a plurality of signaling windows, and each signaling window has a common duration.

19. A system comprising:
an interconnect comprising a plurality of lanes, wherein the plurality of lanes include a plurality of dedicated data lanes and at least one dedicated valid signal lane;
a first device; and
a second device communicatively coupled to the first device using the interconnect, wherein the second device is to:
send one or more link training signals comprising instances of a link training pattern to the first device on the plurality of lanes;
enter an active link state based on training of the plurality of lanes using the link training signals;
send a valid signal to the first device on the valid lane during the active link state, wherein the valid signal comprises a signal held at a value throughout a first signaling window and indicates that data is to be sent on the plurality of data lanes in a second signaling window subsequent to the first signaling window; and
send the data, during the active link state, to the first device on the plurality of data lanes during the second signaling window.

20. The system of claim 19, wherein the first device is to determine a phase interpolation to be applied to sampling of the plurality of lanes based on the training signals.

* * * * *